(12) United States Patent
Obora et al.

(10) Patent No.: US 11,203,605 B2
(45) Date of Patent: Dec. 21, 2021

(54) METHOD FOR PRODUCING ORGANOSILICON COMPOUND BY HYDROSILYLATION WITH METALLIC-ELEMENT-CONTAINING NANOPARTICLES

(71) Applicant: THE SCHOOL CORPORATION KANSAI UNIVERSITY, Osaka (JP)

(72) Inventors: Yasushi Obora, Osaka (JP); Xianjin Lin, Osaka (JP); Yumiko Nakajima, Ibaraki (JP); Shigeru Shimada, Ibaraki (JP); Kazuhiko Sato, Ibaraki (JP)

(73) Assignee: THE SCHOOL CORPORATION KANSAI UNIVERSITY, Osaka (JP)

( * ) Notice: Subject to any disclaimer, the term of this patent is extended or adjusted under 35 U.S.C. 154(b) by 117 days.

(21) Appl. No.: 16/509,788

(22) Filed: Jul. 12, 2019

(65) Prior Publication Data

US 2019/0337967 A1 Nov. 7, 2019

Related U.S. Application Data

(63) Continuation of application No. PCT/JP2017/046103, filed on Dec. 22, 2017.

(30) Foreign Application Priority Data

Jan. 13, 2017 (JP) .............................. JP2017-004391

(51) Int. Cl.
*C07F 7/08* (2006.01)
*B01J 23/42* (2006.01)

(52) U.S. Cl.
CPC ............ *C07F 7/0829* (2013.01); *B01J 23/42* (2013.01)

(58) Field of Classification Search
None
See application file for complete search history.

(56) References Cited

U.S. PATENT DOCUMENTS

2015/0000513 A1   2/2015   Komati et al.

FOREIGN PATENT DOCUMENTS

| JP | 2012-000593 | 1/2012 |
| JP | 2015-129103 | 7/2015 |
| JP | 2015-520019 | 7/2015 |

OTHER PUBLICATIONS

International Search Report dated Feb. 13, 2018 in International Application No. PCT/JP2017/046103.
International Preliminary Report on Patentability dated Oct. 24, 2018 in International Application No. PCT/JP2017/046103, with English Translation.
Bandari et al., "Polymeric monolith supported Pt-nanoparticles as ligan-free catalysts for olefin hydrosilyation under batch and continous conditions", Catalysis Science and Technology, 2012, vol. 2, pp. 220-226.

(Continued)

*Primary Examiner* — Clinton A Brooks
(74) *Attorney, Agent, or Firm* — Wenderoth, Lind & Ponack, L.L.P.

(57) ABSTRACT

An organosilicon compound can be efficiently produced by using metallic element-containing nanoparticles such as a platinum element-containing nanoparticle having a solvent on surface as a catalyst of the hydrosilylation reaction of alkenes.

2 Claims, 19 Drawing Sheets

(56) References Cited

OTHER PUBLICATIONS

Bai et al., "Use of functionalized PEG with 4-aminobenzoic acid stabilized platinum nanoparticles as an efficient catalyst for the hydrosilylation of alkenes", Journal of Colloid and Interface Science, 2013, vol. 394, pp. 428-433.

Alauzun et al., "Pt(0)-Based Catalyst Supported on Silica Containing Di(ethylene oxide) Units for Hydrosilylation of Unsaturated Carbon—Carbon Bonds", Chemistry of Materials, 2007, vol. 19, No. 26, pp. 6373-6375.

Vorgnkov et al., "The Catalytic Reactions of Triethyl- and Triethoxy-Silane With Unsaturated Sulphides", Journal of Organometallic Chemistry, 1980, vol. 190, pp. 335-341.

Speier et al., "The Addition of Silicon Hydrides to Olefinic Double Bonds. Part II. The Use of Group VIII Metal Catalysts", Journal of American Chemical Society, 1957, vol. 79, No. 4, pp. 974-979.

Masatake Haruta, "Novel Catalysis by Gold: from Nanoparticles to Clusters", Molecular Science, 2012, vol. 6, No. 1, A0056, 8 sheets.

Kawasaki et al., "Surfactant-free solution synthesis of fluorescent platinum subnanoclusters", Chemical Communications, 2010, vol. 46, No. 21, pp. 3759-3761.

Hitchcock et al., "Synthesis and Structure of a rac-Tris(divinyldisiloxane)diplatinum(0) Complex and its Reaction with Maleic Anhydride", Angew. Chern. Int. Ed. Engl., 1991, vol. 30, No. 4, pp. 438-440.

Bart et al., "Preparation and Molecular and Electronic Structures of Iron(0) Dinitrogen and Silane Complexes and Their Application to Catalytic Hydrogenation and Hydrosilation", Journal of the American Chemical Society, 2004, vol. 126, pp. 13794-13807.

Buslov et al., "Chemoselective Alkene Hydrosilylation Catalyzed by Nickel Pincer Complexes", Angew. Chem., Ind. Ed., 2015, vol. 54, No. 48, pp. 14523-14526.

Srinivas et al., "Bis(acetylacetonato)Ni(II)/NaBHEt$_3$-catalyzed hydrosilylation of 1,3-dienes, alkenes and alkynes", Journal of Organometallic Chemistry, vol. 809, 2016, pp. 57-62.

Boslov et al., "An Easily Accessed Nickel Nanoparticle Catalyst for Alkene Hydrosilylation with Tertiary Silanes", Angew. Chem., Int. Ed., 2016, vol. 55, No. 40, pp. 12295-12299.

METHOD FOR PRODUCING ORGANOSILICON COMPOUND BY HYDROSILYLATION WITH METALLIC-ELEMENT-CONTAINING NANOPARTICLES

This is a continuation of International Application PCT/JP2017/046103, filed on Dec. 22, 2017, and designated the U.S., and claims priority from Japanese Patent Application 2017-004391 which was filed on Jan. 13, 2017, the entire contents of which are incorporated herein by reference.

TECHNICAL FIELD

The present invention relates to a method of producing an organosilicon compound, and in particular, to a method of producing an organosilicon compound by hydrosilylation using metallic element-containing nanoparticles.

BACKGROUND ART

The hydrosilylation reaction of olefins is one of the most useful reactions in the chemical industry. The resulting organosilicon compound (alkylsilane) is a raw material for producing a lubricant, an adhesive, a sealant, and a silicone-based coating agent, as well as a building block which is useful for organic synthesis such as a raw material in Hiyama cross coupling reaction.

As catalysts used for the hydrosilylation reaction of olefins, Speier's catalyst (see Non-patent Document 1), Karstedt's catalyst (see Non-patent Document 2), an iron-pincer complex catalyst (see Non-patent Document 3), a nickel-pincer complex catalyst (see Non-patent Document 4), a nickel complex and $NaBHEt_3$ (see Non-patent Document 5), a nickel nanoparticle catalyst (see Non-patent Document 6) and the like have been reported.

PRIOR ART REFERENCES

Non Patent Documents

[NON PATENT DOCUMENT 1] J. L. Speier, J. A. Webster, G. H. Barnes, J. Am. Chem. Soc. 1957, 79, 974.
[NON PATENT DOCUMENT 2] P. B. Hitchcock, M. F. Lappert, N. J. W. Warhurst, Angew. Chem. Int. Ed. Engl. 1991, 30, 43.
[NON PATENT DOCUMENT 3] S. C. Bart, E. Lobkovsky, P. J. Chirik, J. Am. Chem. Soc. 2004, 126, 13794.
[NON PATENT DOCUMENT 4] I. Buslov, J. Becouse, S. Mazza, M. Montandon-Clerc, X. Hu, Angew. Chem. Int. Ed. 2015, 54, 14523.
[NON PATENT DOCUMENT 5] V. Srinivas, Y. Nakajima, W. Ando, K. Sato, S. Shimada, JOMC, 2016, 809, 57.
[NON PATENT DOCUMENT 6] I. Buslov, F. Song, X. Hu, Angew. Chem. Int. Ed. 2016, 55, 12295.

SUMMARY OF THE INVENTION

Technical Problem

One object of the present invention is to find an effective catalyst for the hydrosilylation reaction of alkenes, and to provide a novel method of producing an organosilicon compound using the hydrosilylation reaction.

Solution to Problem

As a result of intensive studies to solve the above problem, the present inventors have found that metallic element-containing nanoparticles such as a platinum element-containing nanoparticle having a solvent on surface are effective as a catalyst in the hydrosilylation reaction of alkenes, and have achieved the present invention.

In other words, the present invention is as follows.
<1> A method of producing an organosilicon compound, comprising a reaction step of reacting an alkene with a hydrosilane in the presence of a platinum element-containing nanoparticle having a solvent on surface to produce an organosilicon compound.
<2> The method of producing an organosilicon compound according to <1>, wherein the reaction step is performed in the presence of an iron element-containing nanoparticle having a solvent on surface in addition to the a platinum element-containing nanoparticle.
<3> The method of producing an organosilicon compound according to <1> or <2>, wherein the alkene is a compound represented by the following formula (A-1) or a compound represented by the following formula (A-2):

wherein in the formula (A-1), $R^1$ is a $C_1$-$C_{20}$ hydrocarbon group, and

wherein in the formula (A-2), R is a $C_1$-$C_{19}$ hydrocarbon group.
<4> The method of producing an organosilicon compound according to any one of <1> to <3>, wherein the hydrosilane is a compound represented by the following formula (B):

wherein in the formula (B), $R^5$ is each independently a $C_1$-$C_{20}$ hydrocarbon group or a $C_1$-$C_{10}$ alkoxy group.
<5> The method of producing an organosilicon compound according to any one of <2> to <4>, wherein the use ratio of the platinum element-containing nanoparticle to the iron element-containing nanoparticle (the amount of substance of the iron element/the amount of substance of the platinum element) is 0.01 to 20.

Advantageous Effects of Invention

According to the present invention, an organosilicon compound can be efficiently produced.

BRIEF DESCRIPTION OF THE DRAWINGS

FIG. 9 is the measurement result of infrared spectroscopy (IR) of iron oxide nanoparticles having a solvent on surface, or the like.

DESCRIPTION OF EMBODIMENTS

Figure 1A:
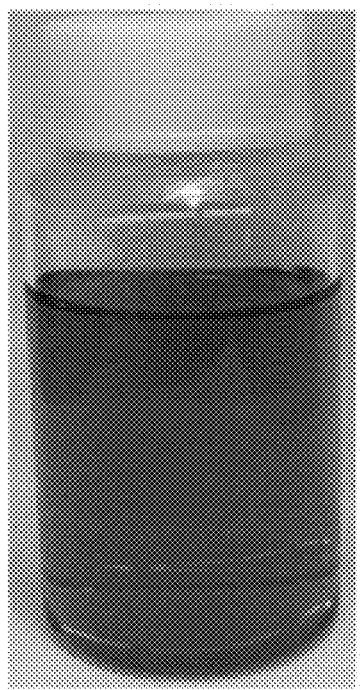
FIG. 1A shows a photograph of dispersions of metallic element-containing nanoparticles having a solvent on surface (a dispersion of metallic platinum nanoparticles having a solvent on surface)

The present invention will be described by way of specific examples; however, the present invention is not limited to the following contents and can be appropriately modified and implemented without departing from the spirit of the present invention.

<Method of Producing an Organosilicon Compound>

In one aspect of the present invention, the method of producing an organosilicon compound (hereinafter sometimes referred to as "the production method of the present invention") comprises a reaction step of reacting an "alkene" with a "hydrosilane" in the presence of "a platinum element-containing nanoparticle having a solvent on surface" to produce an "organosilicon compound" (hereinafter sometimes referred to as "reaction step").

The present inventors have found that metallic element-containing nanoparticles such as a platinum element-containing nanoparticle having a solvent on surface are effective as a catalyst in hydrosilylation reaction of alkenes, particularly in hydrosilylation reaction in which a tertiary hydrosilane is used. The metallic element-containing nanoparticles having a solvent on surface have advantages because they are easy to handle, allowing for a simplified production process and they can be also recovered for reuse as a catalyst after being used in the reaction. For example, although complex catalysts such as Speier's catalyst and Karstedt's catalyst can offer a high catalytic activity, they are generally inactivated or decomposed after the completion of the reaction, which results in difficulty in their reuse. Since the metallic element-containing nanoparticles having a solvent on surface are protected on the surface by the solvent, it is believed that they are unlikely to deteriorate and thus the catalytic activity is easily maintained. Therefore, it can be contemplated that the production method of the present invention is a method which is excellent in economic efficiency.

The "platinum element-containing nanoparticle" mean a particle having a particle size (cumulative median diameter (median diameter)) in the range of 0.5 to 100 nm and containing platinum element as a constituent element.

In addition, "having a solvent on surface" means that a solvent molecule is coordinated to a platinum atom on the surface of the platinum element-containing nanoparticle. It should be noted that whether or not the "solvent" is coordinated to the platinum element-containing nanoparticle can be judged based on whether or not the platinum element-containing nanoparticles are stably dispersed in a "solvent" without surface treatment by a dispersant or the like. In other words, for example, a platinum element-containing nanoparticle having N,N-dimethylformamide (DMF) coordinated can be stably dispersed in a "solvent" having an affinity for DMF.

The term "alkenes" indicates organic compounds having at least one carbon-carbon double bond, and the term "hydrosilanes" indicates organosilicon compounds having at least one silicon-hydrogen bond (Si—H), and the term "organosilicon compounds" indicates organic compounds having at least one carbon-silicon bond (C—Si). Accordingly, the reaction of an "alkene" with a "hydrosilane" includes, for example, a reaction shown by the following reaction formula (the "alkene" is "1-decene" and the "hydrosilane" is trimethylsilane).

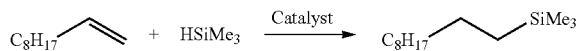

The "alkenes", "hydrosilanes", conditions of the reaction step, and the like will be described below in detail.

(Alkenes)

The specific type of "alkenes" used in the reaction step is not particularly limited and should be appropriately selected according to the organosilicon compound to be produced. The examples of alkenes include a compound represented by the formula (A). The "compound represented by the formula (A)" will be described below in detail.

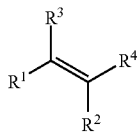
(A)

(In the formula (A), $R^1$ to $R^4$ each independently represent a hydrogen atom or a $C_1$-$C_{20}$ hydrocarbon group which may contain at least one atom selected from the group consisting of an oxygen atom, a sulfur atom, and a halogen atom. When two or more of $R^1$ to $R^4$ are hydrocarbon groups, two or more hydrocarbon groups may be linked to form a cyclic structure.)

$R^1$ to $R^4$ in the formula (A) each independently represent a "hydrogen atom" or a "$C_1$-$C_{20}$ hydrocarbon group which may contain at least one atom selected from the group consisting of an oxygen atom, a sulfur atom, and a halogen atom," and the "hydrocarbon group" may have each of a branched structure or a cyclic structure, and may be any of a saturated hydrocarbon group, an aromatic hydrocarbon group, and the like. "May contain at least one atom selected from the group consisting of an oxygen atom, a sulfur atom, and a halogen atom" means that a hydrogen atom of the hydrocarbon group may be substituted by a monovalent functional group containing a nitrogen atom, an oxygen atom, a sulfur atom, a halogen atom or the like, and that a carbon atom constituting the carbon skeleton of the hydrocarbon group may be substituted by divalent or higher functional group (linking group) containing a nitrogen atom, an oxygen atom, a sulfur atom, a halogen atom or the like.

When $R^1$ to $R^4$ are a hydrocarbon group, examples of the functional groups contained in the hydrocarbon group include ether groups (oxa groups, —O—), thioether groups (thia groups, —S—), and ester groups (—C(O)—O—).

The number of carbon atoms of the hydrocarbon group when $R^1$ to $R^4$ are a hydrocarbon group is usually 20 or less, preferably 15 or less, more preferably 10 or less, and the number of carbon atoms in the case where $R^1$ to $R^4$ are an aromatic hydrocarbon group is usually 6 or more.

Examples of $R^1$ to $R^4$ include hydrogen atoms, methyl groups (—CH$_3$, -Me), ethyl groups (—C$_2$H$_5$, -Et), n-propyl groups (—$^n$C$_3$H$_7$, —$^n$Pr), i-propyl groups (—$^i$C$_3$H$_7$, —$^i$Pr), n-butyl groups (—$^n$C$_4$H$_9$, —$^n$Bu), t-butyl groups (—$^t$C$_4$H$_9$, -tBu), n-pentyl groups (—$^n$C$_5$H$_{11}$), n-hexyl groups (—$^n$C$_6$H$_{13}$, -$^n$Hex), n-octyl groups (—$^n$C$_8$H$_{17}$, -$^n$Oct), methylthiomethyl groups (—CH$_2$SCH$_3$), cyclohexyl groups (—$^c$C$_6$H$_{11}$, -Cy), phenyl groups (—C$_6$H$_5$, -Ph) and the like.

Examples of the compound represented by the formula (A) include a compound represented by the following formula (A-1) and a compound represented by the following formula (A-2), in which $R^2$=$R^3$=$R^4$=H.

(A-1)

(In the formula (A-1), $R^1$ is a $C_1$-$C_{20}$ hydrocarbon group).

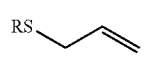
(A-2)

(In the formula (A-2), R is a $C_1$-$C_{19}$ hydrocarbon group).

Specific examples of the compound represented by the formula (A) include compounds represented by the following formulas.

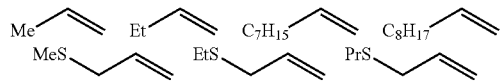

(Hydrosilanes)

The specific type of "hydrosilanes" used in the reaction step is not particularly limited and should be appropriately selected according to the organosilicon compound to be produced. The examples of the hydrosilanes include a compound represented by the formula (B), which is a tertiary hydrosilane. The "compound represented by the formula (B)" will be described below in detail.

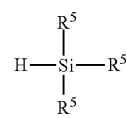
(B)

(In the formula (B), $R^5$ is each independently a $C_1$-$C_{20}$ hydrocarbon group or a $C_1$-$C_{10}$ alkoxy group).

$R^5$ in the formula (B) is independently a "$C_1$-$C_{20}$ hydrocarbon group," "a $C_1$-$C_{10}$ alkoxy group," and the "hydrocarbon group" has the same definition as in the case of $R^1$ or the like. The number of carbon atoms of the hydrocarbon group when $R^5$ is a hydrocarbon group is usually 20 or less, preferably 15 or less, more preferably 10 or less, and number of carbon atoms in the case where $R^5$ is an aromatic hydrocarbon group is usually 6 or more. The number of carbon atoms of the alkoxy group when $R^5$ is an alkoxy group is usually 8 or less, preferably 6 or less.

Examples of $R^5$ include methyl groups (—CH$_3$, -Me), ethyl groups (—C$_2$H$_5$, -Et), n-propyl groups (—$^n$C$_3$H$_7$, —$^n$Pr), i-propyl groups (—$^i$C$_3$H$_7$, —$^i$Pr), n-butyl groups (—$^n$C$_4$H$_9$, -$^n$Bu), t-butyl groups (—$^t$C$_4$H$_9$, -tBu), n-pentyl groups (—$^n$C$_5$H$_{11}$), n-hexyl groups (—$^n$C$_6$H$_{13}$, -$^n$Hex), n-octyl groups (—$^n$C$_8$H$_{17}$, -$^n$Oct), cyclohexyl groups (—$^c$C$_6$H$_{11}$, -Cy), phenyl groups (—C$_6$H$_5$, -Ph), methoxy groups (—OCH$_3$, —OMe), ethoxy groups (—OC$_2$H$_5$, -OEt), n-propoxy groups (—O$^n$C$_3$H$_7$, —O$^n$Pr), i-propoxy groups (—O$^i$C$_3$H$_7$, —O$^i$Pr), n-butoxy groups (—O$^n$C$_4$H$_9$, —O$^n$Bu), t-butoxy groups (—O$^t$C$_4$H$_9$, —O$^t$Bu), phenoxy groups (—OC$_6$H$_5$, —OPh).

Specific examples of a compound represented by the formula (B) include compounds represented by the following formulas.

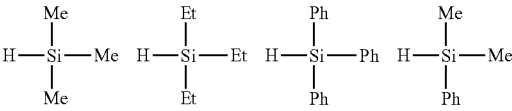

-continued

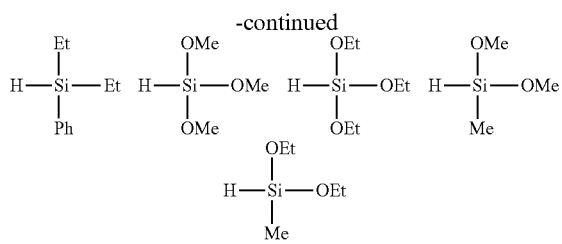

The amount to be used (charged amount) of a hydrosilane in the reaction step is usually 1 or more, usually 20 times or less, preferably 10 times or less, more preferably 6 times or less with respect to the carbon-carbon double bond of an alkene, based on the amount of substance. Within the above range, an organosilicon compound can be more efficiently produced.

(Platinum Element-Containing Nanoparticle Having a Solvent on Surface)

The specific type, the composition and the like of the solvent of "a platinum element-containing nanoparticle having a solvent on surface" used in the reaction step are not particularly limited, and will be described in detail below by way of specific examples.

Examples of solvents include hydrocarbon solvents such as hexane, benzene and toluene, ether solvents such as diethyl ether, 1,4-dioxane and tetrahydrofuran (THF), halogen solvents such as 1,2-dichloroethane and chloroform, protic polar solvents such as ethanol, ethylene glycol and glycerin, aprotic polar solvents such as acetone, dimethylacetamide (DMA), N,N-dimethylformamide (DMF), N-methylpyrrolidone (NMP), and dimethylsulfoxide (DMSO). The solvent which is coordinated to the surface can be substituted appropriately. For example, DMF is distilled off from a DMF dispersion of metallic platinum nanoparticles coordinated with DMF, using a rotary evaporator or the like to obtain metallic platinum nanoparticles as a solid. Then, the solid is brought into contact with another solvent such as THF, and blended by stirring or the like. Metallic platinum nanoparticles coordinated with THF can be thus obtained.

The platinum element-containing nanoparticle preferably contain an oxygen element in addition to the platinum element, and metallic platinum particles doped with oxygen atoms or metallic platinum particles with the surface oxidized are particularly preferred.

The particle size (cumulative median diameter (median diameter)) of a platinum element-containing nanoparticle is preferably 1.5 nm or more, more preferably 2.0 nm or more, still more preferably 3.0 nm or more, and preferably 100 nm or less, more preferably 50 nm or less, still more preferably 20 nm or less. The cumulative median diameter (median diameter) can be measured by a transmission electron microscope (TEM).

The method of preparing the platinum element-containing nanoparticle having a solvent on surface is not specifically limited. One example includes a method of heating under reflux a precursor containing platinum element in a polar solvent.

The conditions and the like in the method of heating under reflux a precursor containing the platinum element in a polar solvent will be described below in detail.

Examples of the type of the precursor containing platinum element include chloroplatinic acid (IV) and the like.

Examples of the polar solvent include ethylene glycol, dimethylacetamide (DMA), N,N-dimethylformamide (DMF), N-methylpyrrolidone (NMP), dimethylsulfoxide (DMSO) and the like. Among these, N,N-dimethylformamide is particularly preferred. The use of N,N-dimethylformamide facilitates the preparation of a platinum element-containing nanoparticle which is excellent in catalytic activity.

The reflux is preferably carried out under stirring using a stirrer or the like. The rotational speed of the stirrer is usually 500 rpm or more, preferably 800 rpm or more, more preferably 1000 rpm or more, and is usually 2000 rpm or less, preferably 1800 rpm or less, more preferably 1700 rpm or less.

The reflux time is usually 1 hour or more, preferably 3 hours or more, more preferably 6 hours or more, and is usually 24 hours or less, preferably 12 hours or less, more preferably 10 hours or less.

The reflux may be carried out under an inert atmosphere such as nitrogen, argon or under an air atmosphere.

The amount to be used (charged amount) of the platinum element-containing nanoparticle having a solvent on surface in the reaction step is, based on the amount of substance of platinum element with respect to the alkenes, usually 0.001 mol % or more, preferably 0.005 mol % or more, more preferably 0.008 mol % or more, and is usually 1.0 mol % or less, preferably 0.8 mol % or less, more preferably 0.3 mol % or less. Within the above range, an organosilicon compound can be more efficiently produced.

(Iron Element-Containing Nanoparticle Having a Solvent on Surface)

The reaction step is preferably performed, in addition to the platinum element-containing nanoparticle having a solvent on surface, in the presence of "an iron element-containing nanoparticle having a solvent on surface". By using an iron element-containing nanoparticle having a solvent on surface, the amount of platinum to be used can be reduced, and an organosilicon compound can be more efficiently produced. The term "an iron element-containing nanoparticle" means, as in the platinum element-containing nanoparticle, particles having a particle size (cumulative median diameter (median diameter)) in the range of 0.5 to 100 nm and containing iron element as a constituent element. The specific type of the solvent, the preparation method and the like of the "iron element-containing nanoparticle having a solvent on surface" are the similar as in the case of the "platinum element-containing nanoparticle having a solvent on surface" described above. The composition of the iron element-containing nanoparticle and the precursor containing iron element will be described in detail below.

The iron element-containing nanoparticle preferably contain oxygen element in addition to iron element. Metallic iron particles or iron alloy particles doped with oxygen atoms, or iron oxide particles are more preferred, and an $\alpha$-$Fe_2O_3$ particle is particularly preferred.

The type of the precursor containing iron element is not particularly limited, and examples thereof include iron (III) chloride ($FeCl_3$), iron (III) bromide ($FeBr_3$), iron (II) acetate ($Fe(CH_3CO_2)_2$), iron (III) citrate ($FeC_6H_5O_7$), ammonium iron (III) sulfate ($FeNH_4(SO_4)_2$), iron (III) acetylacetonate ($Fe(CH_3COCHCOCH_3)_3$) and the like. Among these, iron (II) acetate and iron (III) acetylacetonate are preferred, and iron (II) acetate is particularly preferred. The use of these results in an easier preparation of an iron element-containing nanoparticle which is excellent in catalytic activity.

The amount to be used (charged amount) of the iron element-containing nanoparticle having a solvent on surface in the reaction step is, based on the amount of substance of the iron element with respect to the alkenes, usually 0.001 mol % or more, preferably 0.005 mol % or more, more preferably 0.008 mol % or more, and is usually 1.0 mol % or less, preferably 0.5 mol % or less, more preferably 0.3 mol % or less.

The use ratio in the reaction step of the platinum element-containing nanoparticle having a solvent on surface to the iron element-containing nanoparticle having a solvent on surface (the amount of substance of iron element/the amount of substance of platinum element) is usually 0.01 or more, preferably 0.05 or more, more preferably 0.1 or more, and is usually 50 or less, preferably 30 or less, more preferably 20 or less.

Within the above range, an organosilicon compound can be more efficiently produced.

The reaction step may use a solvent or may be without a solvent. Furthermore, when a solvent is used, the type of the solvent is not particularly limited and can be appropriately selected according to the purpose. Specific examples thereof include hydrocarbon solvents such as hexane, benzene and toluene, ether solvents such as diethyl ether, 1,4-dioxane and tetrahydrofuran (THF), halogen solvents such as 1,2-dichloroethane and chloroform, protic polar solvents such as ethanol, ethylene glycol and glycerin, aprotic polar solvents such as acetone, dimethylacetamide (DMA), N,N-dimethylformamide (DMF), N-methylpyrrolidone (NMP), and dimethylsulfoxide (DMSO).

The reaction temperature in the reaction step is usually 70° C. or more, preferably 80° C. or more, more preferably 90° C. or more, and is usually 130° C. or less, preferably 120° C. or less, more preferably 110° C. or less. Within the above range, an organosilane compound can be produced with a better yield.

The reaction time of the reaction step is usually 2 hours or more, preferably 4 hours or more, more preferably 8 hours or more, and is usually 48 hours or less, preferably 36 hours or less, more preferably 28 hours or less.

The reaction step is usually carried out under an inert atmosphere such as nitrogen or argon.

The specific type of the organosilicon compound produced in the reaction step is not particularly limited and can be appropriately selected according to the purpose of the production. The examples thereof include a compound represented by the following formula (C) or (D).

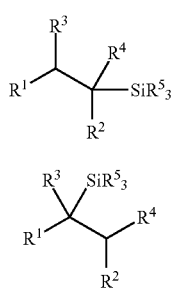

(In the formulas (C) and (D), $R^1$ to $R^4$ each independently is a hydrogen atom or a $C_1$-$C_{20}$ hydrocarbon group which may contain at least one atom selected from the group consisting of an oxygen atom, a sulfur atom, and a halogen atom, and $R^5$ is independently a hydrogen atom, a $C_1$-$C_{20}$ hydrocarbon group, or a $C_1$-$C_{10}$ alkoxy group.)

In addition, $R^1$, $R^2$, $R^3$, $R^4$, and $R^5$ have the same definition as in the case of the compound represented by the formula (A) and the compound represented by the formula (B).

EXAMPLES

The present invention will be more specifically described by way of Examples as below, but the present invention can be modified as appropriate without departing from the spirit of the present invention. Accordingly, the scope of the present invention should not be construed as being limited to the specific examples shown below.

Synthesis Example 1: Preparation of Dispersion of Metallic Platinum Nanoparticles Having a Solvent on Surface Dehydrated N,N-dimethylformamide (DMF) was added under an air atmosphere to a 100 mL three-necked flask connected to a Dimroth condenser and immersed in an oil bath heated to 140° C. The pre-heating was performed under an air atmosphere for about 10 minutes under reflux conditions along with a rotation by a stirrer at 1500 rpm. After that, chloroplatinic (IV) acid hydrate (0.05 mmol) was added under an air atmosphere, and the mixture was heated under reflux at 140° C. for 8 hours under stirring. Over time, the reaction solution became an orange clear dispersion. After heating under reflux for 8 hours, the mixture was cooled to a room temperature. Thus, a dispersion of metallic platinum nanoparticles (hereinafter sometimes abbreviated as "PtNPs") was obtained. The photograph of the obtained dispersion is shown in FIG. 1A. The DMF was added in an amount that would result in the volume of 50 mL of the solution to which the chloroplatinic acid was added. Assuming that all of the chloroplatinic acid became metallic platinum nanoparticles, the concentration of the platinum element in the dispersion would be 1 mmol/L.

Figure 1B:
FIG. 1B shows a photograph of dispersions of metallic element-containing nanoparticles having a solvent on surface (a dispersion of iron oxide nanoparticles having a solvent on surface).

Synthesis Example 2: Preparation of Dispersion of Iron Oxide Nanoparticles Having Solvent Coordinated to Surface Dehydrated N,N-dimethylformamide (DMF) was added under an air atmosphere to a 100 mL three-necked flask connected to a Dimroth condenser and immersed in an oil bath heated to 140° C. The pre-heating was performed under an air atmosphere for about 10 minutes under reflux conditions along with a rotation by a stirrer at 1500 rpm. After that, iron (II) acetate (0.05 mmol) was added under an air atmosphere, and the mixture was heated under reflux at 140° C. for 8 hours under stirring. Over time, the reaction solution became an orange dispersion. After heating under reflux for 8 hours, the mixture was cooled to a room temperature. Thus, a dispersion of iron oxide nanoparticles (hereinafter sometimes abbreviated as "FeNPs-OAc") was obtained. The photograph of the obtained dispersion is shown in FIG. 1B. The DMF was added in an amount that would result in the volume of 50 mL of the solution to which the iron acetate was added. Assuming that all of the iron acetate became iron oxide nanoparticles, the concentration of the iron element in the dispersion would be 1 mmol/L.

Synthesis Example 3: Preparation of Dispersion of Iron Element-Containing Nanoparticles Having Solvent Coordinated to Surface Dehydrated N,N-dimethylformamide (DMF) was added under an air atmosphere to a 100 mL three-necked flask connected to a Dimroth condenser and immersed in an oil bath heated to 140° C. The pre-heating was performed under an air atmosphere for about 10 minutes under reflux conditions along with a rotation by a stirrer at 1500 rpm. After that, iron (III) acetylacetonate (0.05 mmol) was added under an air atmosphere, and the mixture was heated under reflux at 140° C. for 8 hours under stirring. Over time, the reaction solution became an orange dispersion. After heating under reflux for 8 hours, the mixture was cooled to a room temperature. Thus, a dispersion of iron element-containing nanoparticles (hereinafter sometimes abbreviated as "FeNPs-acac") was obtained. The DMF was added in an amount that would result in the volume of 50 mL of the solution to which the iron (III) acetylacetonate was added. Assuming that all of the iron (III) acetylacetonate became iron oxide nanoparticles, the concentration of the iron element in the dispersion would be 1 mmol/L.

<Infrared Spectroscopic (IR) Measurement on Metallic Element-Containing Nanoparticles Having Solvent Coordinated to Surface>

Figure 9:
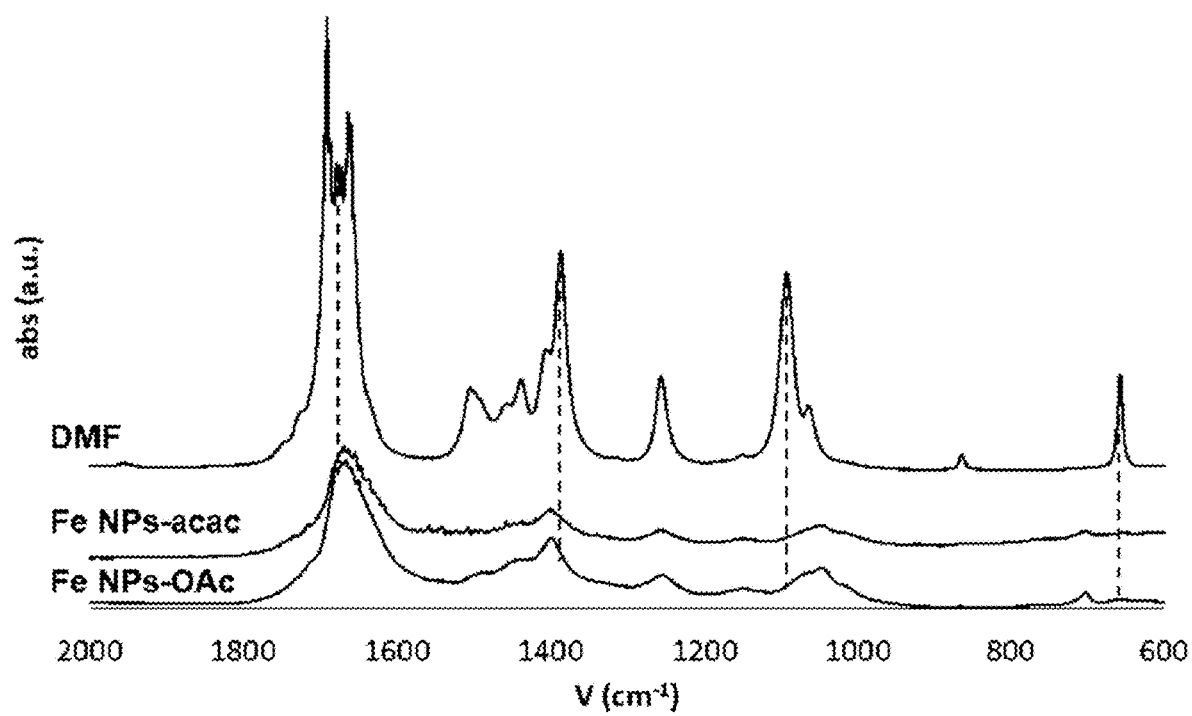
Figure 10:
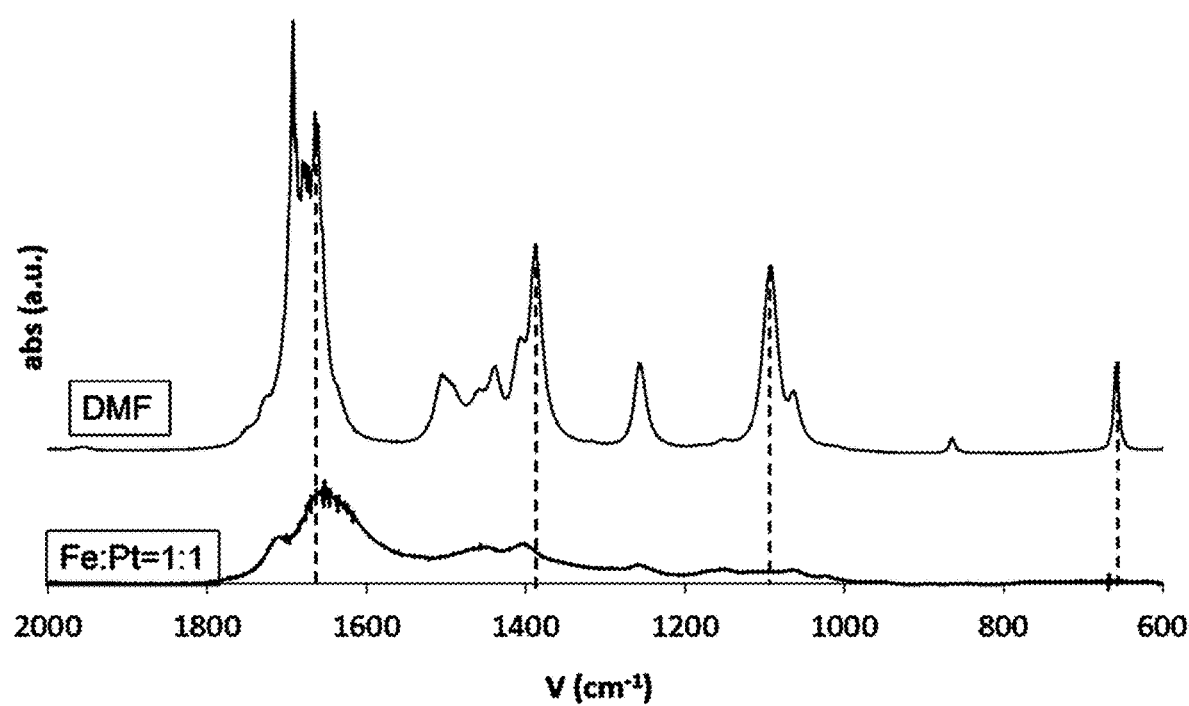
FIG. 10 shows the measurement result of infrared spectroscopy (IR) of a mixture or the like of iron oxide nanoparticles having a solvent on surface and metallic platinum nanoparticles having a solvent on surface.

The IR spectrum was measured under air at a normal temperature by putting the fine particle sample with the solvent distilled off (pasty solid) between NaCl plates. The IR spectra are shown in FIGS. 9 and 10. According to the IR spectrum of the iron element-containing nanoparticles shown in FIG. 9, the apparition of a peak corresponding to C=O stretch derived from DMF in the vicinity of 1650 $cm^{-1}$ can confirm the protection by the N,N-dimethylformamide molecules on the metal nanoparticles.

<Measurement of Ultraviolet-Visible Absorption Spectrum and Fluorescence Spectrum of Metallic Element-Containing Nanoparticles Having Solvent Coordinated to Surface>

Figure 11:
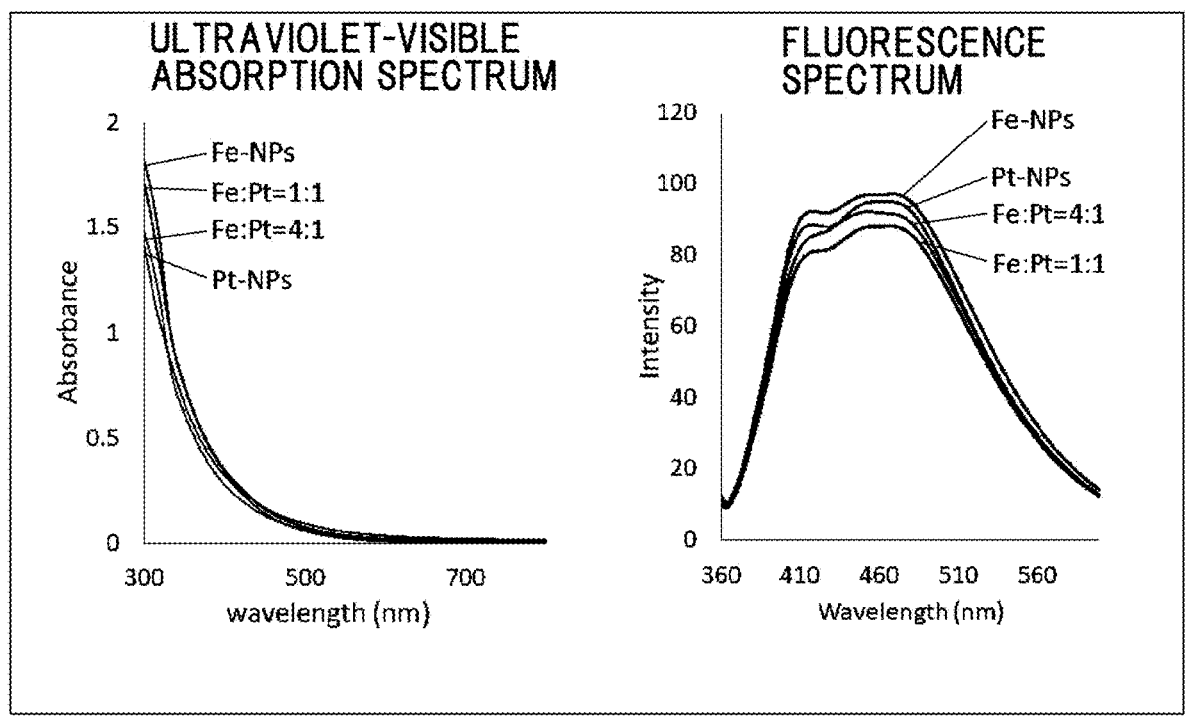
FIG. 11 shows the results of ultraviolet-visible absorption spectrum and fluorescence spectrum of metallic element-containing nanoparticles having a solvent on surface.

The ultraviolet-visible absorption spectrum and the fluorescence spectrum were measured for the obtained metallic element-containing nanoparticles using a DMF solvent prepared at a concentration of 0.1 mM. The fluorescence spectrum was measured under the condition of UV excitation wavelength of 350 nm. The spectrum is shown in FIG. 11. According to FIG. 11, different results of ultraviolet-visible absorption spectrum and the fluorescence spectrum were obtained by mixing iron fine particles and platinum fine particles, thereby confirming the formation of alloyed fine particles which were different from iron and platinum fine particle precursors.

<Imaging of a High-Resolution Transmission Electron Microscope (HRTEM) and the Measurement of Energy-Dispersive X-Ray Spectroscopy (EDS) of Metallic Element-Containing Nanoparticles Having Solvent Coordinated to Surface>

Figure 12:
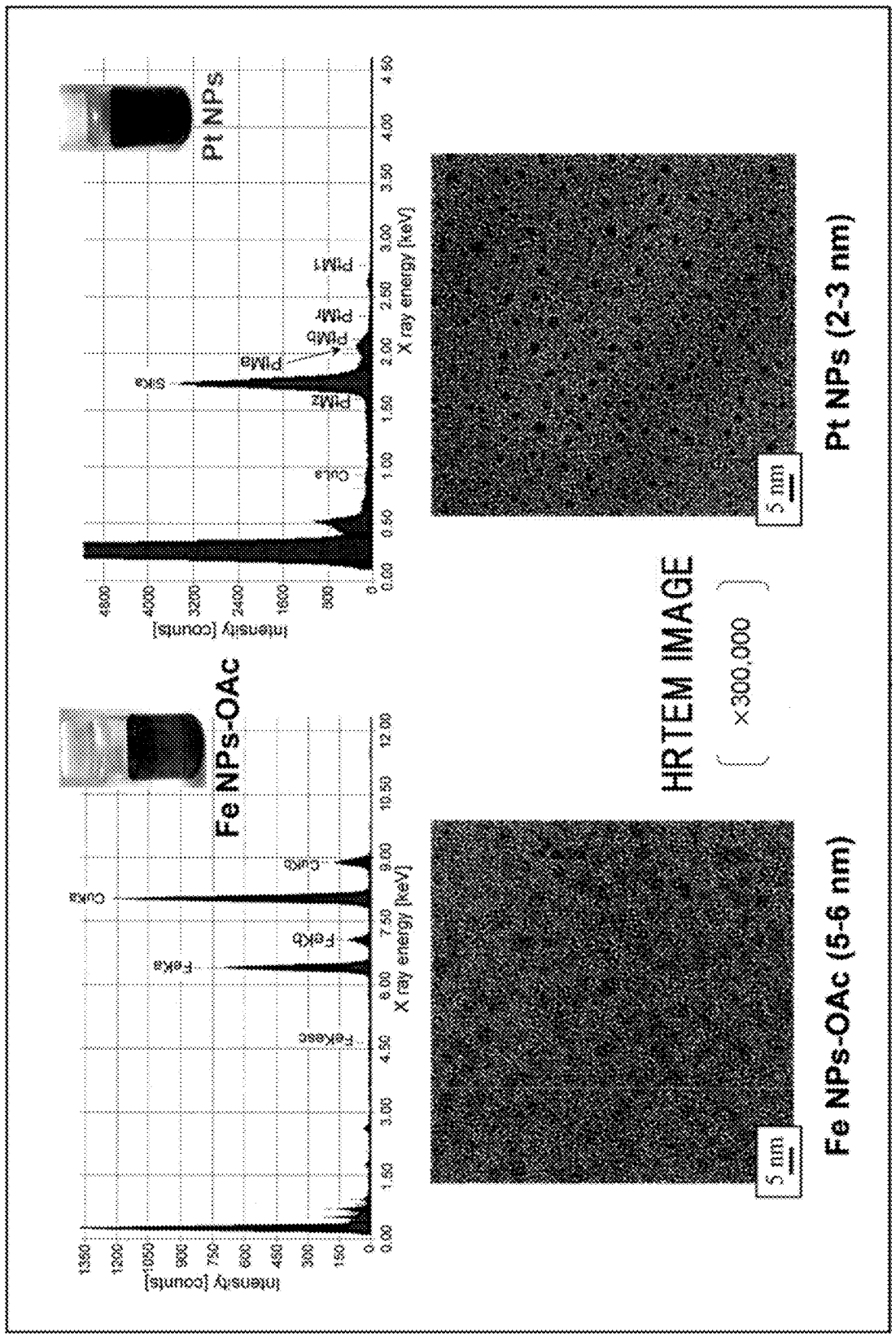
FIG. 12 shows a photographed image of high-resolution transmission electron microscope (HRTEM) and the measurement result of energy-dispersive X-ray spectroscopy (EDS) of metallic element-containing nanoparticles having a solvent on surface (photograph substituting for a drawing).
Figure 13:
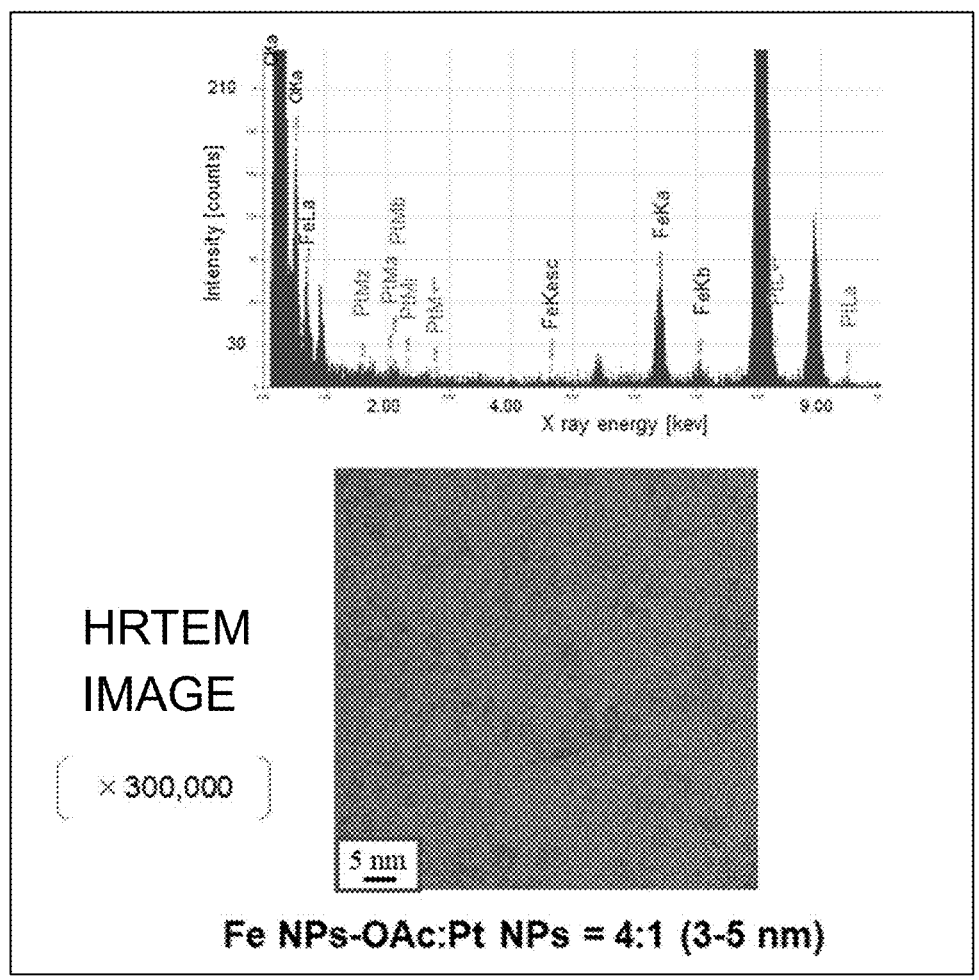
FIG. 13 shows a photographed image of high-resolution transmission electron microscope (HRTEM) and the measurement result of energy-dispersive X-ray spectroscopy (EDS) of a mixture or the like of iron oxide nanoparticles having a solvent on surface and metallic platinum nanoparticles having a solvent on surface (photograph substituting for a drawing).

For a high-resolution transmission electron microscope (HRTEM) imaging and the energy-dispersive X-ray spectroscopy (EDS), the particle size of fine particles in a 1 mM DMF solution of metallic element-containing nanoparticles was observed, and the elements present on the particles were measured. For transmission electron microscope (HRTEM), field emission transmission electron microscope manufactured by JEOL Ltd. (JEM-2010F) and the EDX detector (VINTAGE) manufactured by Thermo Electron Corporation were used under the condition of an accelerating voltage of 200 kV for the observation of metal fine particles in a 1 nM DMF solution. The results are shown in FIGS. 12 and 13. According to FIG. 12, in iron fine particles, particles containing an iron element and having the size of 5 to 6 nm were observed, and in platinum fine particles, particles containing platinum and having the size of 2 to 3 nm were observed. As shown in FIG. 13, in iron-platinum alloy fine particles, particles of 3 to 5 nm in size containing both iron and platinum were observed.

<Measurement of X-Ray Photoelectron Spectroscopy (XPS) of Metallic Element-Containing Nanoparticles Having Solvent Coordinated to Surface>

Figure 14:
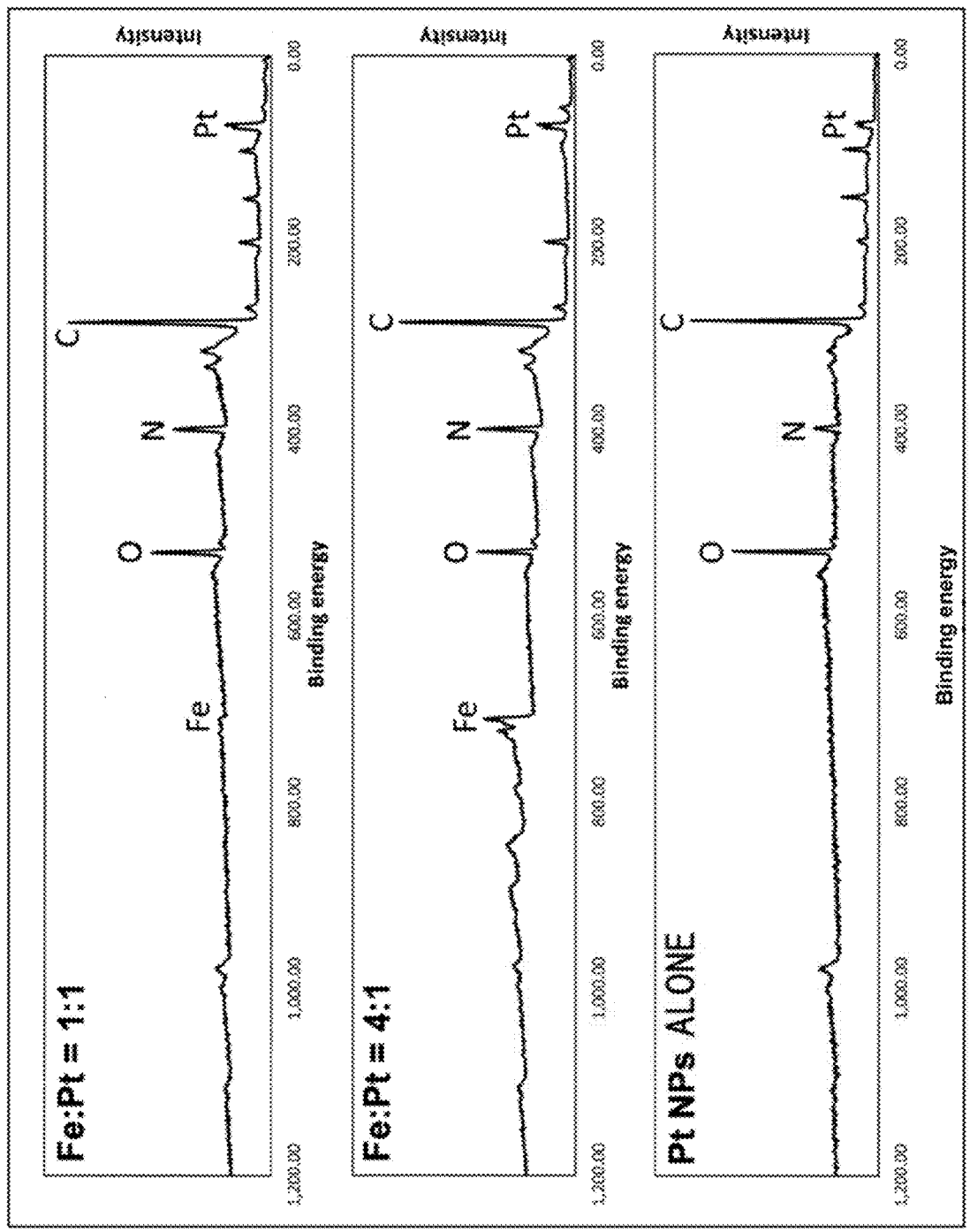
FIG. 14 shows a measurement result of X-ray photoelectron spectroscopy (XPS) of metallic element-containing nanoparticles having a solvent on surface.
Figure 15:
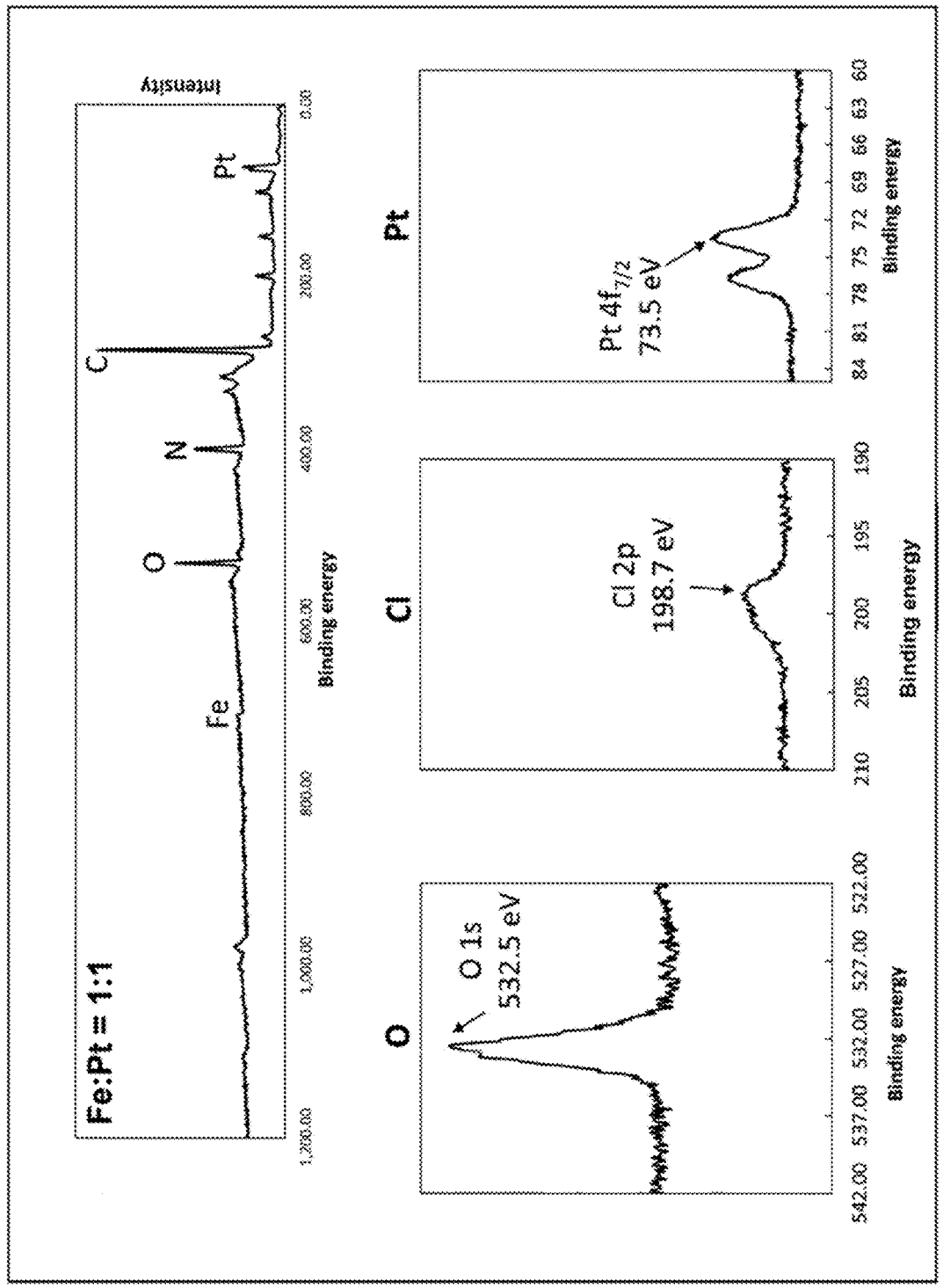
FIG. 15 shows a measurement result of X-ray photoelectron spectroscopy (XPS) of metallic element-containing nanoparticles having a solvent on surface.
Figure 16:
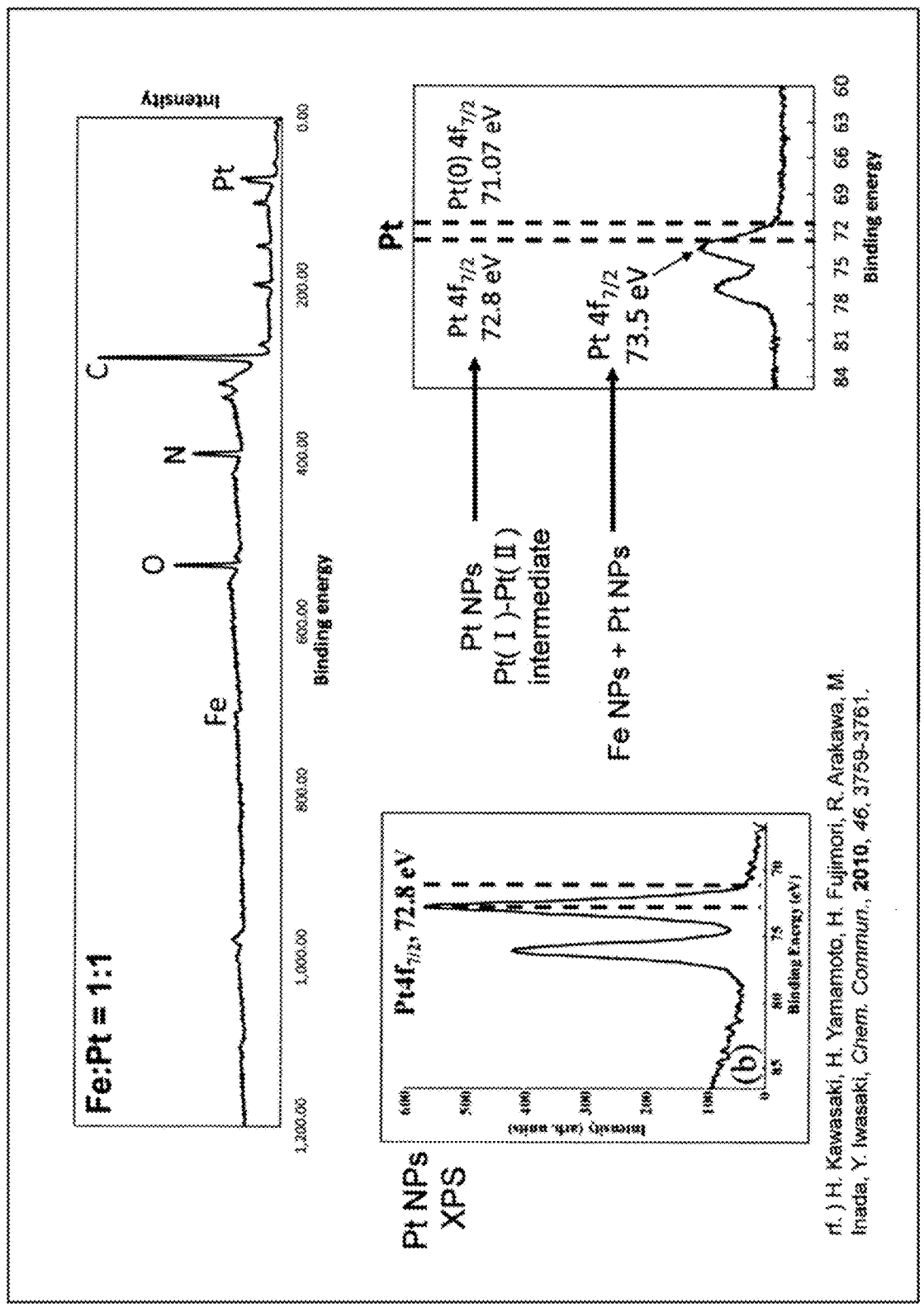
FIG. 16 shows a measurement result of X-ray photoelectron spectroscopy (XPS) of metallic element-containing nanoparticles having a solvent on surface.

For XPS measurement, PHI 5000 VersaProbe manufactured by ULVAC-PHI, Inc. was used to measure under high vacuum conditions ($10^{-7}$ Pa) the metal nanoparticles from which the solvent was distilled off with a vacuum pump ($10^{-5}$ Pa). The results are shown in FIGS. 14 to 16. As a result of the XPS measurement, the peaks corresponding to the iron and platinum elements were observed in the iron-platinum alloy sample, and thus the formation of an iron-platinum alloy by mixing an iron fine particle solution and a platinum fine particle solution was confirmed. In addition, the peak corresponding to platinum in XPS in iron-platinum alloy (Pt4f7/2) is 73.5 eV, and the peak appears at a different position compared to the corresponding peak (72.8 eV) of platinum fine particles alone, which confirms that iron-platinum alloy nanoparticles are obtained.

<X-Ray Fluorescence (XRF) Measurement on Metallic Element-Containing Nanoparticles Having Solvent Coordinated to Surface>

Figure 17:
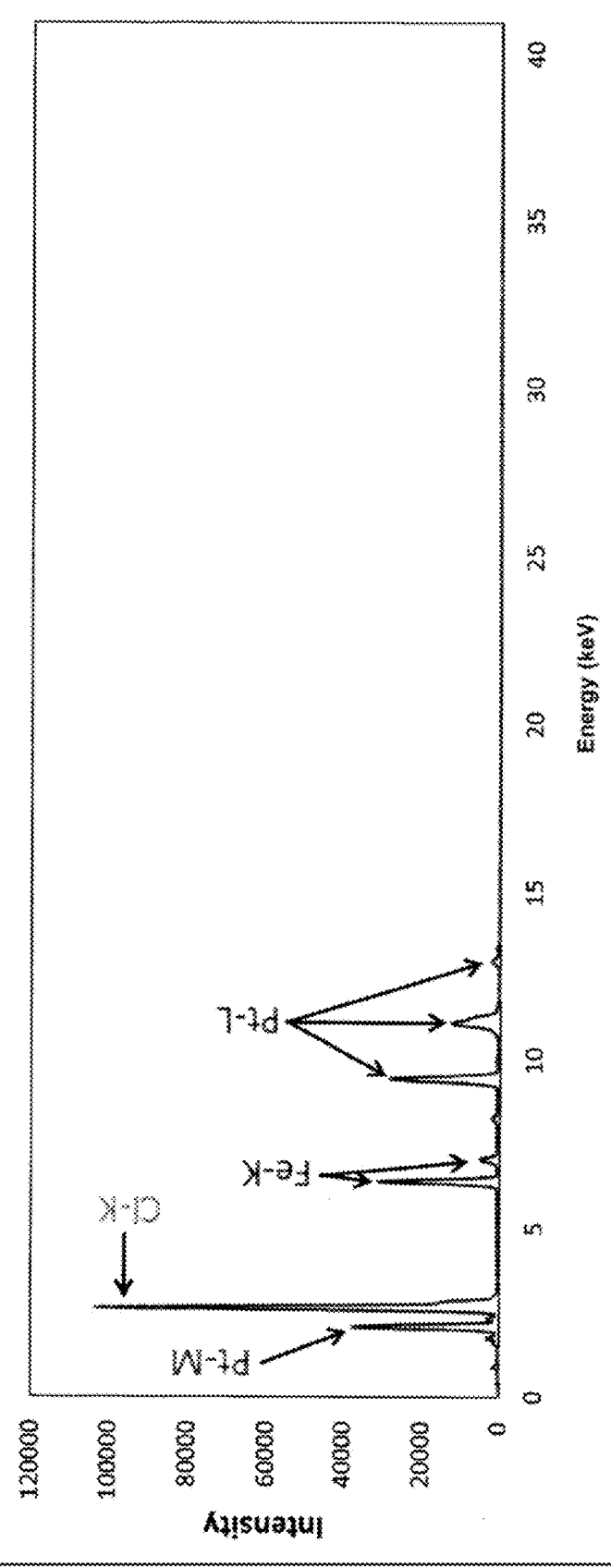
FIG. 17 shows a measurement result of X-ray fluorescence (XRF) of metallic element-containing nanoparticles having a solvent on surface.

The XRF measurement was carried out on a 1:1 mixture of iron-platinum from which the DMF solvent was completely distilled off using a vacuum pump to measure the proportion of elements contained in the sample. For the XRF measurement, JEOL JSX-1000S was used and the sample with the solvent distilled off was attached on a Kapton sheet. The result is shown in FIG. 17. The ratio of Pt:Fe=47.4:52.3 matches with the mixing ratio of iron:platinum (1:1) prepared at the time of synthesis.

Example 1

So that the amount of substance of the platinum element would be 0.1 mol % with respect to allyl methyl sulfide described later, 0.5 mL of the dispersion of PtNPs prepared in Synthesis Example 1 (when it was assumed that all of the chloroplatinic acid become metallic platinum nanoparticles, the amount of substance of the platinum element: 0.5 µmol) was charged in a Schlenk tube, and the DMF was distilled off using a rotary evaporator (40 hPa, 70° C.). The Schlenk tube was connected to a vacuum line and the liquid on the wall surface was distilled off.

Then, a hot stirrer was set to 70° C., and a stirrer was placed into the Schlenk tube. A three-way cock with a balloon attached was installed to the mouth of the Schlenk tube, and then the Schlenk tube was purged with argon. An argon atmosphere was obtained by repeating the vacuum and argon introduction three times in the Schlenk tube.

Figure 2:
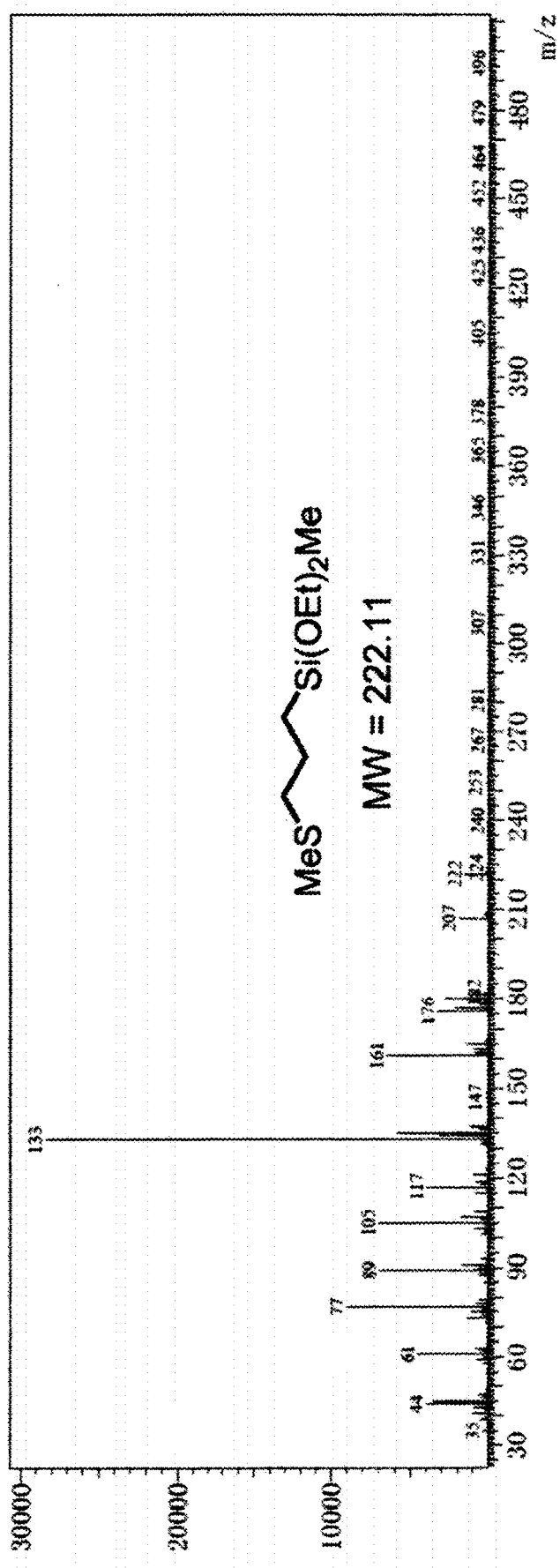
FIG. 2 is an MS spectrum of the product obtained in Example 1.

Subsequently, using a syringe, allyl methyl sulfide (Compound 1 of the following formula, 0.5 mmol) and diethoxy(methyl)silane (Compound 2 of the following formula, 3.0 mmol) were charged, and the mixture was vigorously stirred with a stirrer in such a way that the solution would not scatter on the wall surface, and reacted at 70° C. for 24 hours. After the reaction was completed, the analysis by gas chromatography-mass spectrometry (GC-MS) confirmed the production of the Compound 3 of the following formula. The conversion ratio of the Compound 1 and the yield of the Compound 3 are shown in Table 1, and the MS spectrum of the Compound 3 is shown in FIG. 2.

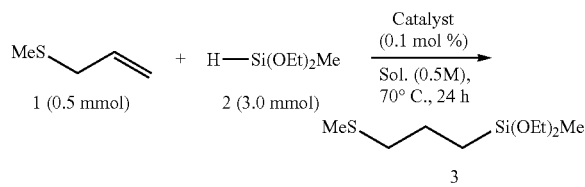

Examples 2 to 5

The reaction was carried out in the same manner as in Example 1 except that the amount to be used of allyl methyl sulfide (Compound 1) and diethoxy(methyl)silane (Compound 2), the catalyst and the solvent were each changed to those described in Table 1. The conversion ratio of the Compound 1 and the yield of the Compound 3 are shown in Table 1. For the catalyst in Example 5 in Table 1, the PtNPs prepared in Synthesis Example 1 and the FeNPs-OAc prepared in Synthesis Example 2 were used in an amount that would result in the ratio of the amount of substance of the platinum element to the iron element of 1:4, and 0.02 mol % and 0.08 mol % (0.1 mol % in total) with respect to the allyl methyl sulfide.

TABLE 1

| | The used amount of Compound 1 | The used amount of Compound 2 | Catalyst | Solvent | The conversion ratio of Compound 1 | The yield of Compound 3 |
|---|---|---|---|---|---|---|
| Example 1 | 0.5 mmol | 3.0 mmol | PtNPs | None | >99% | 19% |
| Example 2 | 3.0 mmol | 0.5 mmol | PtNPs | None | 58% | 24% |
| Example 3 | 0.5 mmol | 3.0 mmol | PtNPs | THF | >99% | 24% |
| Example 4 | 0.5 mmol | 3.0 mmol | PtNPs | 1,4-dioxane | >99% | 20% |
| Example 5 | 0.5 mmol | 3.0 mmol | PtNPs + FeNPs-OAc (Pt:Fe: 1:4) | None | 94 | 34% |

Examples 6 to 9

Figure 3:
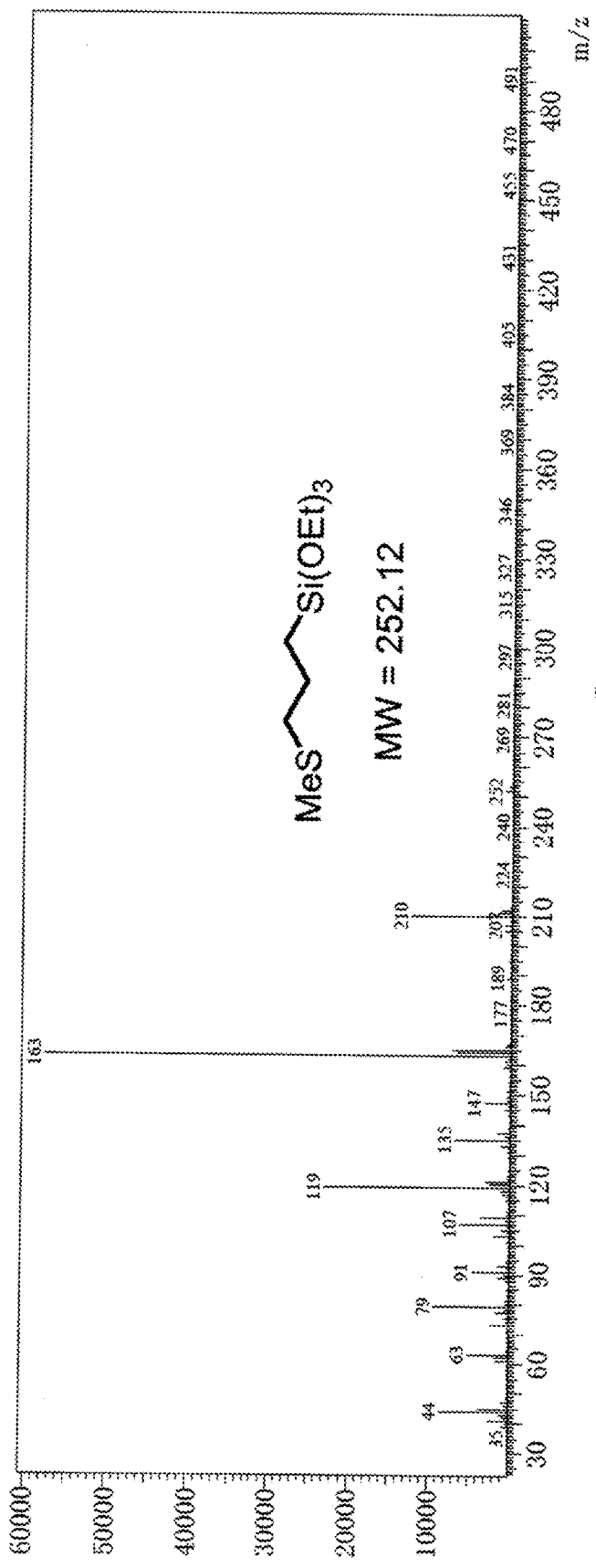
FIG. 3 is an MS spectrum of the product obtained in Example 6.
Figure 4:
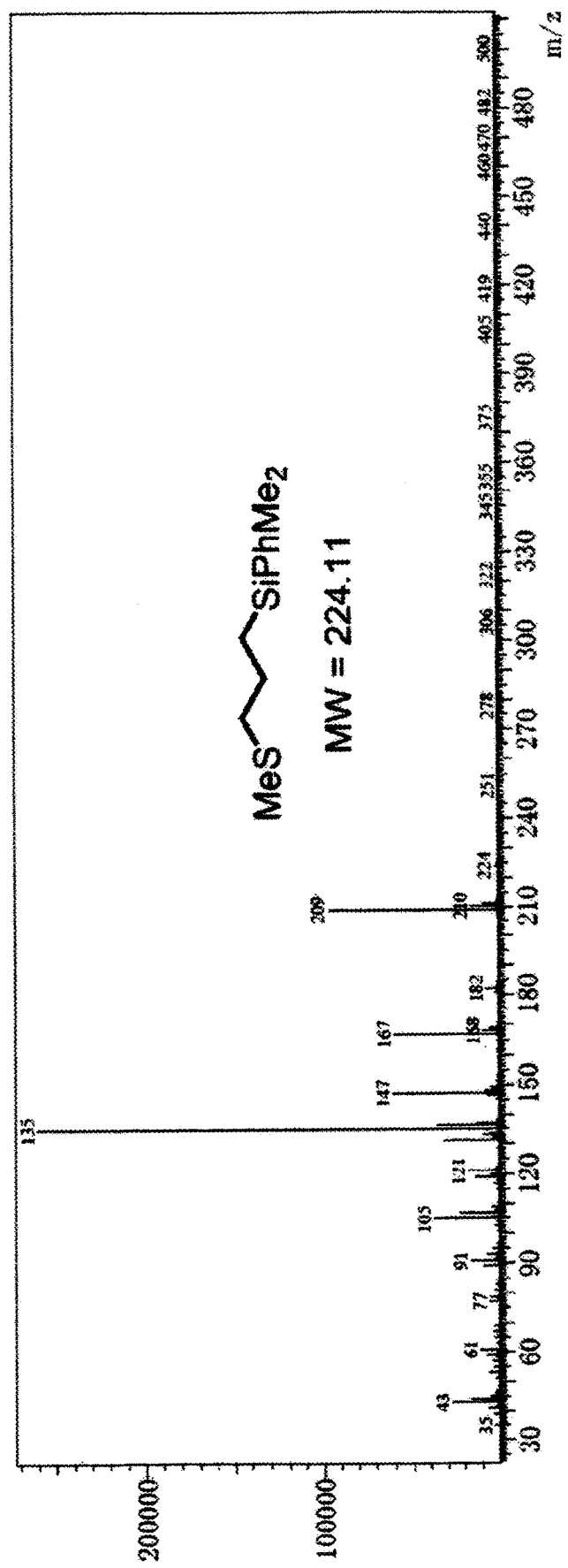
FIG. 4 is an MS spectrum of the product obtained in Example 8.

The reaction was carried out in the same manner as in Example 1 except that the diethoxy(methyl)silane (a hydrosilane) and the catalyst were each changed to those described in Table 2. The yield of the products is shown in Table 2, and the MS spectra of the products are shown in FIGS. 3 and 4. For the catalyst in Example 9 in Table 2, the PtNPs prepared in Synthesis Example 1 and the FeNPs-OAc prepared in Synthesis Example 2 were used in an amount that would result in the ratio of the amount of substance of the platinum element to the iron element of 1:4, and 0.02 mol % and 0.08 mol % (0.1 mol % in total) with respect to the allyl methyl sulfide.

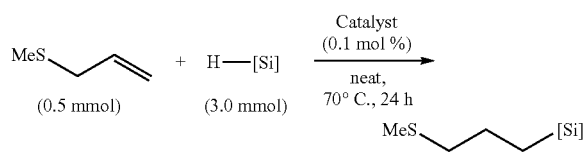

TABLE 2

| | Hydrosilanes | Catalyst | Products and the yield |
|---|---|---|---|
| Example 6 | HSi(OEt)$_3$ | PtNPs | MeS~~~Si(OEt)$_3$ (19%) |
| Example 7 | HSiEt$_3$ | PtNPs | MeS~~~SiEt$_3$ (96%) |
| Example 8 | HSiPhMe$_2$ | PtNPs | MeS~~~SiPhMe$_2$ (42%) |
| Example 9 | HSiPhMe$_2$ | PtNPs + FeNPs—OAc (Pt:Fe:1:4) | MeS~~~SiPhMe$_2$ (45%) |

Example 10

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:4, and 0.02 mol % and 0.08 mol % (0.1 mol % in total) with respect to 1-decene described later, and the DMF was distilled off using a rotary evaporator (40 hPa, 70° C.). The Schlenk tube was connected to a vacuum line and the liquid on the wall surface was distilled off.

Then, a hot stirrer was set to 100° C., and a stirrer was placed into the Schlenk tube. A three-way cock with a balloon attached was installed to the mouth of the Schlenk tube, and then the Schlenk tube was purged with argon. An argon atmosphere was obtained by repeating the vacuum and argon introduction three times in the Schlenk tube.

Figure 5:
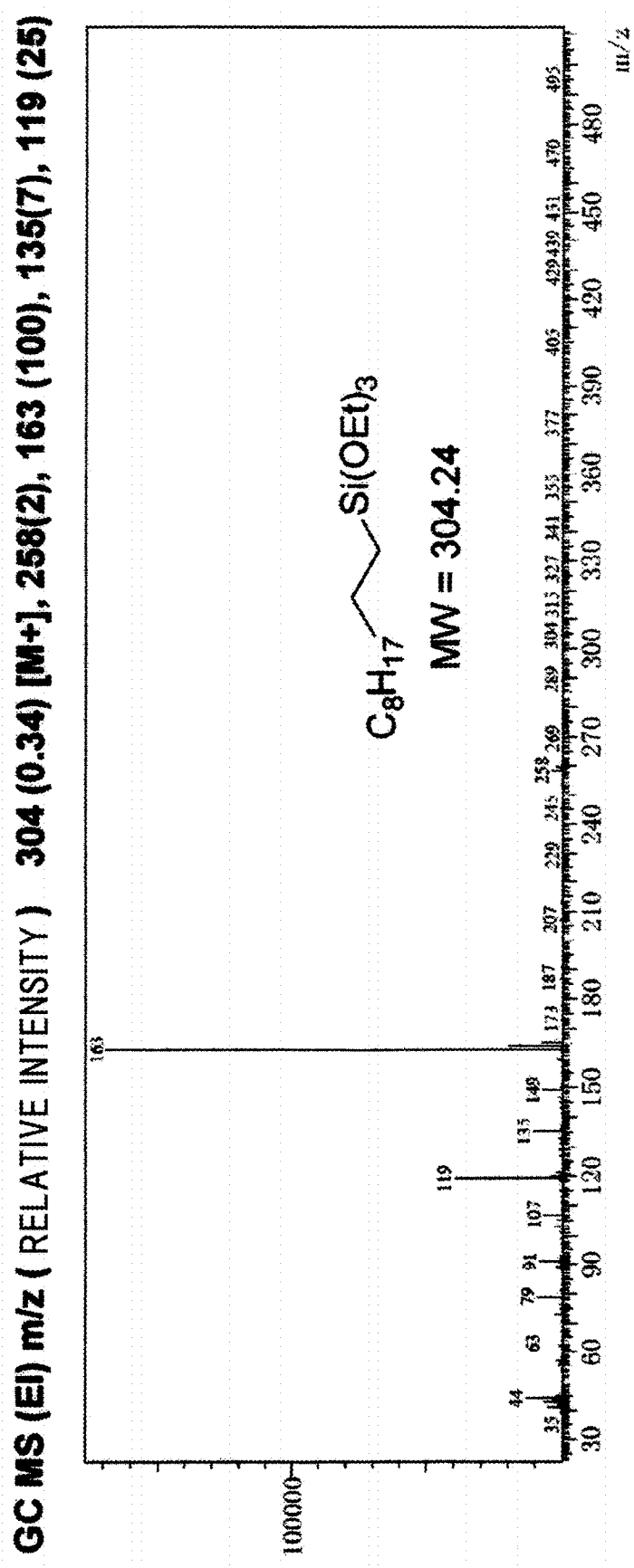
FIG. 5 is an MS spectrum of the product obtained in Example 10.

Subsequently, using a syringe, 1-decene (70.1 mg, 0.5 mmol) and triethoxysilane (492.8 mg, 3.0 mmol) were charged, and the mixture was vigorously stirred with a stirrer in such a way that the solution would not scatter on the wall surface, and reacted at 100° C. for 24 hours. After the reaction was completed, the analysis by gas chromatography-mass spectrometry (GC-MS) confirmed the production of the compound 3 of the following formula. The yield of the Compound 3 is shown in Table 3, and the MS spectrum of the Compound 3 is shown in FIG. 5.

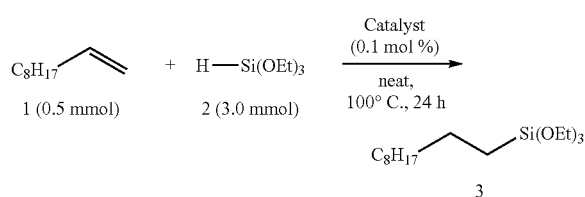

Example 11

The reaction was performed in the same manner as in Example 10 except that the FeNPs-OAc was changed to the FeNPs-acac prepared in Synthesis Example 3. The yield of the Compound 3 is shown in Table 3.

Example 12

The reaction was performed in the same manner as in Example 10 except that the PtNPs prepared in Synthesis Example 1 and the FeNPs-OAc prepared in Synthesis Example 2 were adjusted so that the ratio of the amount of substance of the platinum element to the iron element would be 1:10. The yield of the Compound 3 is shown in Table 3.

TABLE 3

| Catalyst | | The yield of Compound 3 |
|---|---|---|
| Example 10 | PtNPs + FeNPs-OAc (Pt:Fe: 1:4) | 46% |
| Example 11 | PtNPs + FeNPs-acac (Pt:Fe: 1:4) | 28% |
| Example 12 | PtNPs + FeNPs-OAc (Pt:Fe: 1:10) | 42% |

Examples 13 to 15

Figure 6:
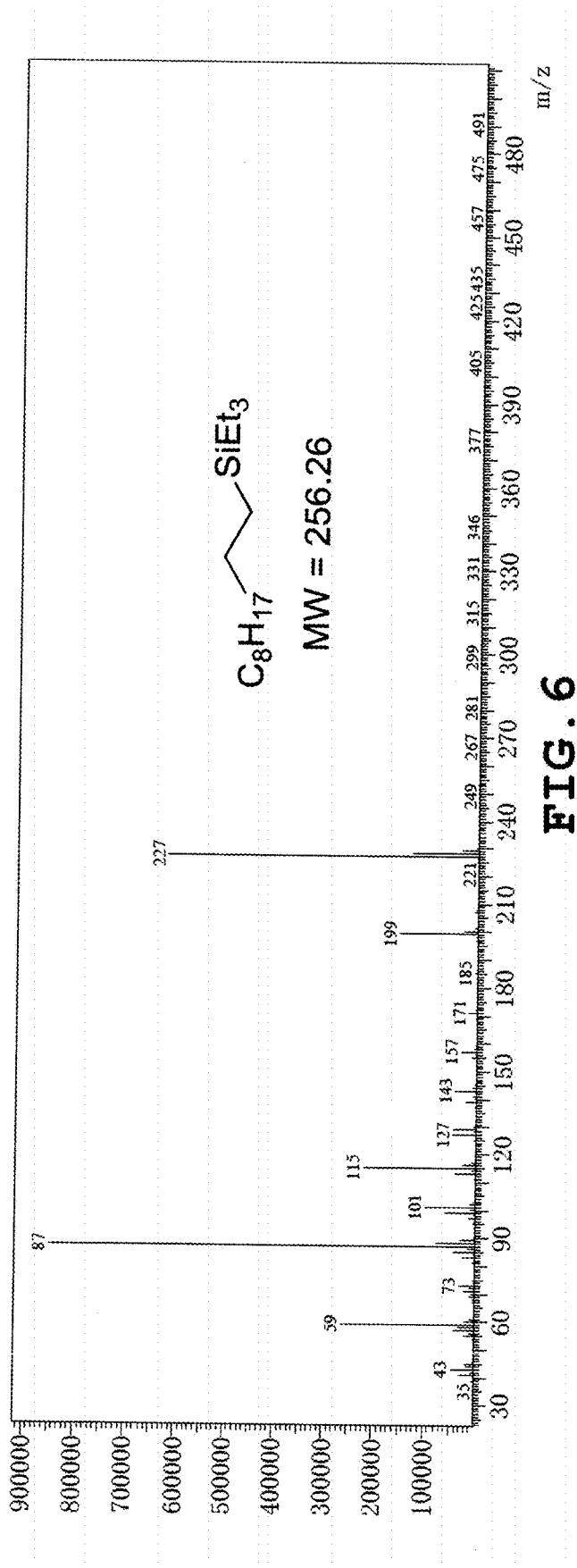
FIG. 6 is an MS spectrum of the product obtained in Example 13.
Figure 7:
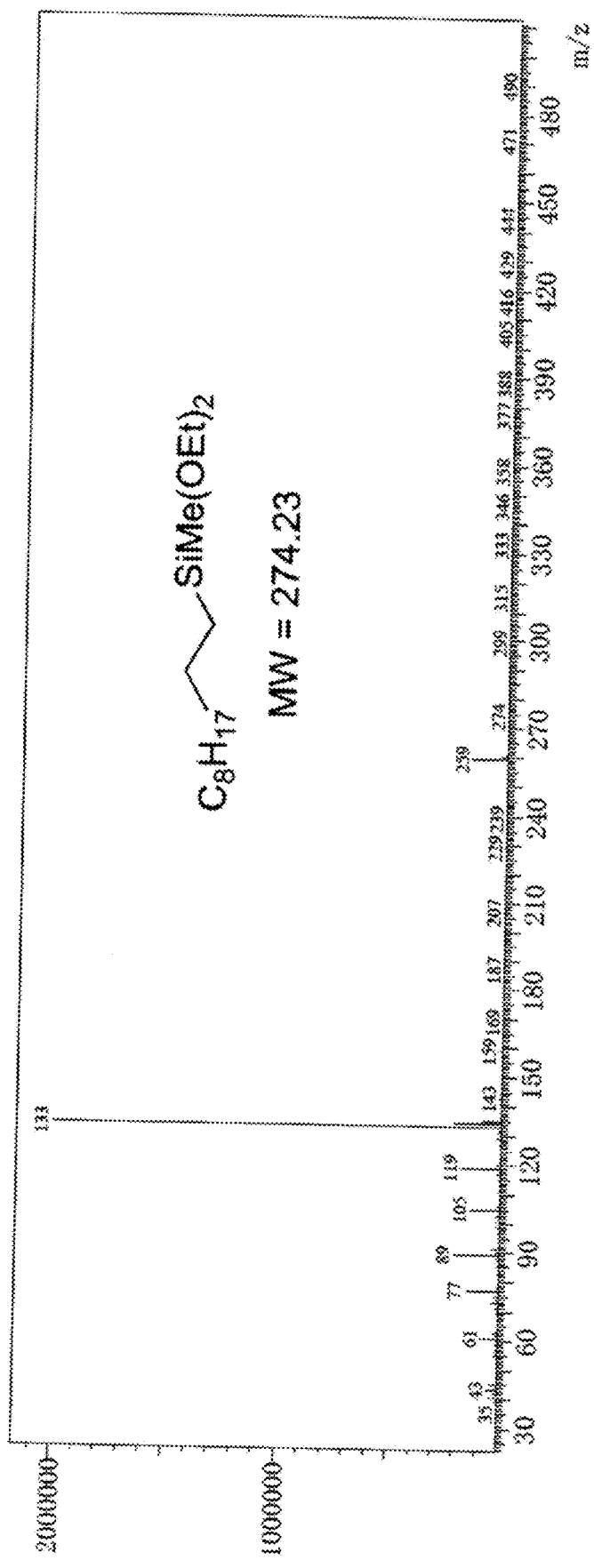
FIG. 7 is an MS spectrum of the product obtained in Example 14.
Figure 8:
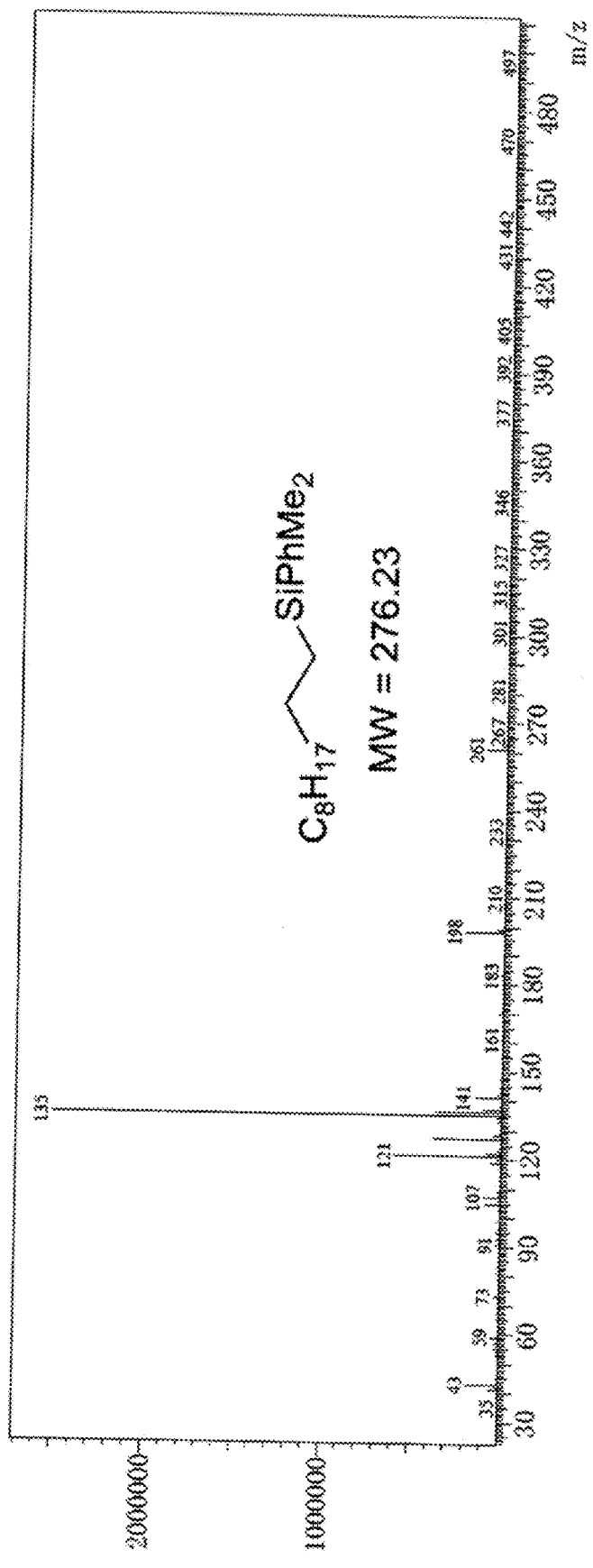
FIG. 8 is an MS spectrum of the product obtained in Example 15.

The reaction was carried out in the same manner as in Example 10 except that the triethoxysilane was changed for each Example to those described in Table 4. The yield of the product is shown in Table 4, and the MS spectra of the products are shown in FIGS. 6 to 8.

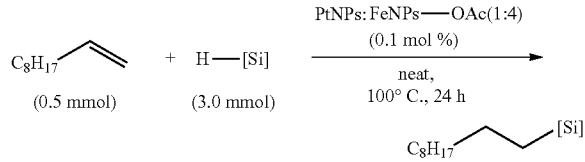

TABLE 4

| | Hydrosilanes | Products and the yield |
|---|---|---|
| Example 13 | HSiEt$_3$ | C$_8$H$_{17}$~~~SiEt$_3$ (14%) |
| Example 14 | HSiMe(OEt)$_2$ | C$_8$H$_{17}$~~~SiMe(OEt)$_2$ (39%) |

TABLE 4-continued

| | Hydrosilanes | Products and the yield |
|---|---|---|
| Example 15 | HSiPhMe$_2$ | C$_8$H$_{17}$~~~SiPhMe$_2$ (72%) |

Examples 16 to 18

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:1, and 0.05 mol % and 0.05 mol % (0.1 mol % in total) with respect to 1-dodecene described later. The DMF was distilled off using a rotary evaporator (25 hPa, 70° C., 15 min), and a residual trace of DMF was further removed with a rotary pump ($10^{-1}$ Pa, 10 min). A stirrer was placed into the Schlenk tube.

Then, 1-dodecene (0.111 mL, 0.5 mmol) and triethoxysilane (amount listed in Table 5 below) were added, and without replacing with inert gas, a closed two-way cock was attached to the Schlenk tube and thus the Schlenk tube was sealed. Then, the reaction solution was heated in an oil bath (100° C., 24 h) to react.

After the completion of the reaction, the reaction solution was placed in an ice bath and quenched by adding n-hexane (10 mL). Then, n-nonane (30 mg) was added as an internal standard, and the solution passed through a membrane filter (0.2 m) was subjected to GC to calculate the yield. The results are shown in Table 5 below.

The short column was then packed with silica (3 cm), and the column chromatography was carried out with ethyl acetate to remove the nanoparticle catalyst and impurities. Then, vacuum suction ($10^{-1}$ Pa) and azeotropic removal with pentane were performed three times to remove impurities (GC yield 95% or more, isolation yield: 81%, 138 mg) (in the case of Example 18).

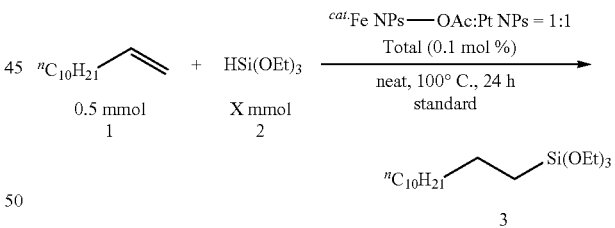

TABLE 5

| | The used amount of Compound 2 | The conversion ratio of Compound 1 | The conversion ratio of Compound 2 | The yield of 3 |
|---|---|---|---|---|
| Example 16 | 0.5 mmol | 68% | >99% | 7% |
| Example 17 | 1.5 mmol | 97% | 96% | 58% |
| Example 18 | 3.0 mmol | 97% | 64% | >95% |

Example 19

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:1, and 0.05 mol % and 0.05 mol % (0.1 mol % in total) with respect to 1-dodecene described later. The two were then mixed and the solvent was distilled off using an evaporator.

Then, 1-dodecene (0.111 mL, 0.5 mmol) and triethoxysilane (0.548 mL, 3 mmol) were added, and without replacing with inert gas, a closed two-way cock was attached to the Schlenk tube and thus the Schlenk tube was sealed. Then, the reaction solution was heated in an oil bath (100° C., 24 h) to react.

After the completion of the reaction, the reaction solution was placed in an ice bath and quenched by adding n-hexane (10 mL). Then, n-nonane (30 mg) was added as an internal standard, and the solution passed through a membrane filter (0.2 μm) was subjected to GC to calculate the yield. The results are shown in Table 6 below.

Example 20

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:1, and 0.05 mol % and 0.05 mol % (0.1 mol % in total) with respect to 1-dodecene described later. The two were then mixed and the solvent was distilled off using an evaporator.

Then, 1-dodecene (0.111 mL, 0.5 mmol), triethoxysilane (0.548 mL, 3 mmol) and DMF (0.5 mL) were added, and without replacing with inert gas, a closed two-way cock was attached to the Schlenk tube and thus the Schlenk tube was sealed. Then, the reaction solution was heated in an oil bath (100° C., 24 h) to react.

After the completion of the reaction, the reaction solution was placed in an ice bath and quenched by adding n-hexane (10 mL). Then, n-nonane (30 mg) was added as an internal standard, and the solution passed through a membrane filter (0.2 m) was subjected to GC to calculate the yield. The results are shown in Table 6 below.

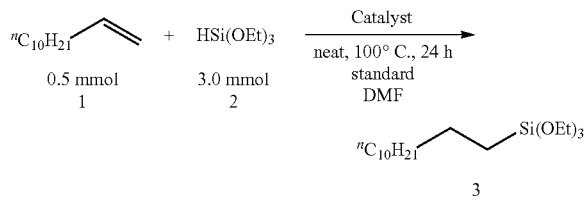

TABLE 6

| | The used amount of DMF | The conversion ratio of Compound 1 | The conversion ratio of Compound 2 | The yield of 3 |
|---|---|---|---|---|
| Example 19 | None | 97% | 64% | >95% |
| Example 20 | 0.5 mL | 42% | >99% | Product not obtained (not detected by GC) |

Examples 21 to 26

Figure 18:
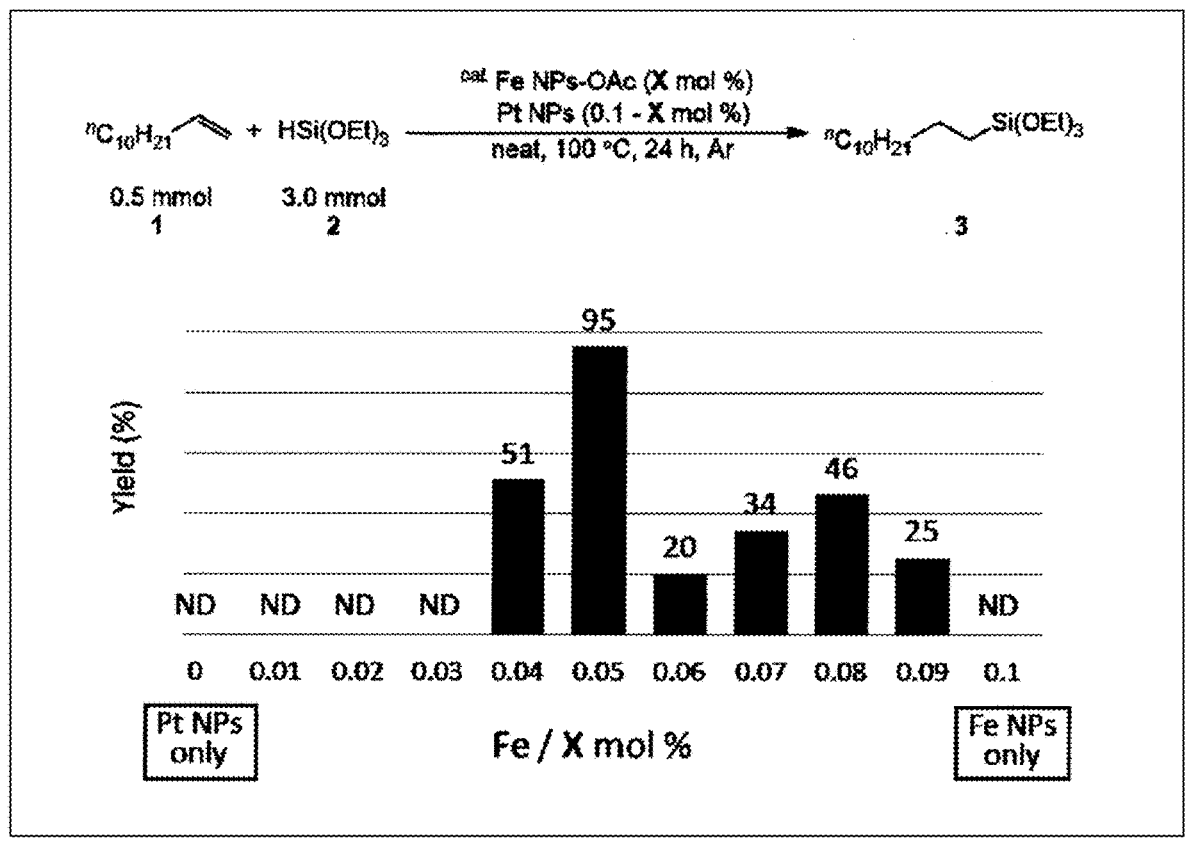
FIG. 18 is a graph which represents the mixing ratio of metallic platinum nanoparticles having a solvent on surface to iron oxide nanoparticles having a solvent on surface and the yield of the organosilicon compound.
Figure 19:
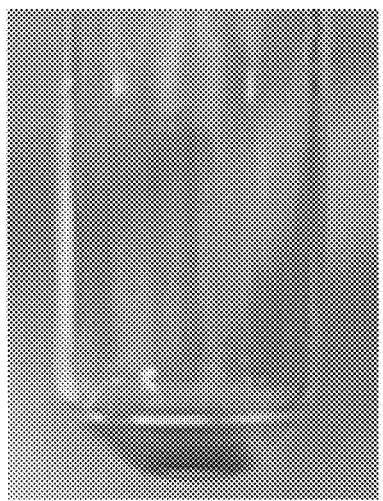
FIG. 19 shows photographs after the completion of the reaction of a mixture of iron oxide nanoparticles having a solvent on surface and metallic platinum nanoparticles having a solvent on surface and of the reaction in the presence of the Speier's catalyst (photograph substituting for a drawing).
Figure 19:
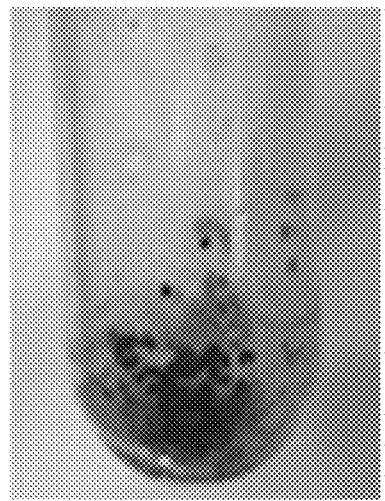

The PtNPs prepared in Synthesis Example 1 and the FeNPs-OAc prepared in Synthesis Example 2 were charged in a Schlenk tube in an amount which was adjusted so that the amount of substance of the platinum element and the amount of substance of the iron element would be in the ratio as described in FIG. 18, and 0.05 mol % and 0.05 mol % (0.1 mol % in total) with respect to 1-dodecene described later. The DMF was distilled off using a rotary evaporator (25 hPa, 70° C., 15 min), and a residual trace of DMF was further removed with a rotary pump ($10^{-1}$ Pa, 10 min). A stirrer was placed into the Schlenk tube.

Then, 1-dodecene (0.111 mL, 0.5 mmol) and triethoxysilane (0.548 mL, 3 mmol, amount described in FIG. 18) were added, and without replacing with inert gas, a closed two-way cock was attached to the Schlenk tube and thus the Schlenk tube was sealed. Then, the reaction solution was heated in an oil bath (100° C., 24 h) to react.

After the completion of the reaction, the reaction solution was placed in an ice bath and quenched by adding n-hexane (10 mL). Then, n-nonane (30 mg) was added as an internal standard, and the solution passed through a membrane filter (0.2 μm) was subjected to GC to calculate the yield. The results are shown in FIG. 18.

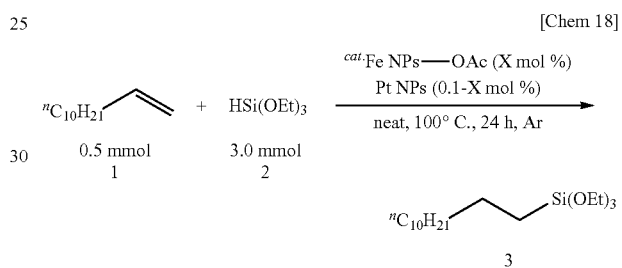

Example 27, Comparative Examples 1 and 2

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:1, and 0.05 mol % and 0.05 mol % (0.1 mol % in total) with respect to 1-dodecene described later. The DMF was distilled off using a rotary evaporator (25 hPa, 70° C., 15 min), and a residual trace of DMF was further removed with a rotary pump ($10^{-1}$ Pa, 10 min). A stirrer was placed into the Schlenk tube.

Then, 1-dodecene (0.111 mL, 0.5 mmol) and triethoxysilane (0.548 mL, 3 mmol) were added, and a balloon filled with oxygen was attached to the reaction vessel. Thus, the reaction was performed under an oxygen atmosphere. Then, the reaction solution was heated in an oil bath (100° C., 24 h) to react.

After the completion of the reaction, the reaction solution was placed in an ice bath and quenched by adding n-hexane (10 mL). Then, n-nonane (30 mg) was added as an internal standard, and the solution passed through a membrane filter (0.2 μm) was subjected to GC to calculate the yield. Moreover, the reaction in which a Speier's catalyst ($H_2PtCl_6 \cdot H_2O$) was used under the same conditions was also carried out as a comparative example. In the case of the Speier's catalyst ($H_2PtCl_6 \cdot H_2O$), the aggregation of platinum species was observed after the completion of the reaction and the deactivation of the catalyst was also observed, whereas in the case of platinum and iron alloys of the present invention, the aggregation of the catalyst was not observed even after the completion of the reaction.

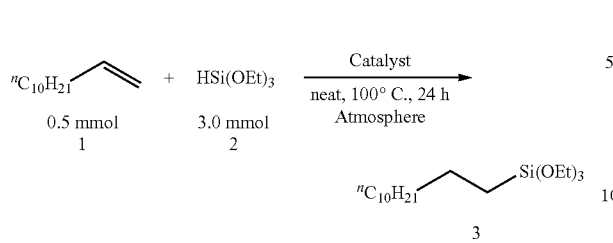

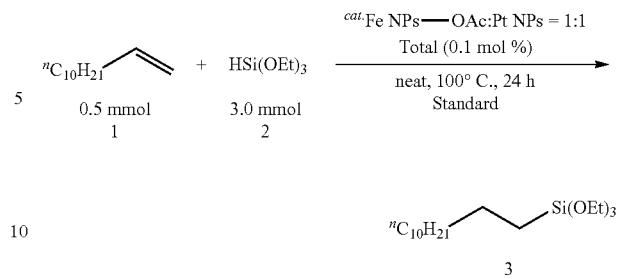

TABLE 7

| Catalyst | | Atmosphere gas | The conversion ratio of Compound 1 | The conversion ratio of Compound 2 | The yield of 3 |
|---|---|---|---|---|---|
| Comparative Example 1 | H₂PtCl₆•H₂0 (0.5 mol %) | Air | 79% | 88% | 83% |
| Comparative Example 2 | | O₂ | 62% | >99% | No data |
| Example 19 | FeNPs + PtNPs (0.1 mol %) | Air | 97% | 64% | >95% |
| Example 27 | | O₂ | 97% | 99% | 59% |

Examples 28 and 29

The PtNPs prepared in Synthesis Example 1 and the FeNPs-OAc prepared in Synthesis Example 2 were charged in a Schlenk tube in an amount that would result in the ratio of the amount of substance of the platinum element to the iron element of 1:4, and 0.02 mol % and 0.08 mol % (0.1 mol % in total) with respect to 1-dodecene described later. The DMF was distilled off using a rotary evaporator (40 hPa, 70° C.). The Schlenk tube was connected to a vacuum line and the liquid on the wall surface was distilled off.

Then, a hot stirrer was set to 100° C., and a stirrer was placed into the Schlenk tube. A three-way cock with a balloon attached was installed to the mouth of the Schlenk tube, and then the Schlenk tube was purged with argon. An argon atmosphere was obtained by repeating the vacuum and argon introduction three times in the Schlenk tube.

Subsequently, using a syringe, 1-dodecene (70.1 mg, 0.5 mmol) and triethoxysilane (492.8 mg, 3.0 mmol) were charged, and the mixture was vigorously stirred with a stirrer in such a way that the solution would not scatter on the wall surface, and reacted at 100° C. for 24 hours. After the completion of the reaction, the analysis by gas chromatography (GC) was performed to determine the yield.

As a method of recycling the catalyst (1), hexane (8 mL) and DMF were added to the reaction solution and shaken well, and then the hexane layer was taken out using a Pasteur pipette. The operation of adding 8 mL of hexane to the DMF layer and removing the hexane layer was further repeated. Subsequently, for the remaining DMF layer, the DMF was distilled off by a rotary evaporator, and using a syringe, 1-dodecene (70.1 mg, 0.5 mmol) and triethoxysilane (492.8 mg, 3.0 mmol) were charged, and the mixture was vigorously stirred with a stirrer in such a way that the solution would not scatter on the wall surface, and reacted at 100° C. for 24 hours. After the completion of the reaction, the analysis by gas chromatography (GC) was performed to determine the yield. After that, the recycling operation of the catalyst described in the above (1) was repeated twice, and the possibility of multiple catalyst recycling by this method was shown.

TABLE 8

| | The number of recycling cycles of catalyst | The yield of 3 |
|---|---|---|
| Example 27 | One recycling cycle | 90% |
| Example 28 | Two recycling cycles | 75% |

INDUSTRIAL APPLICABILITY

The nitrogen-containing silicon-containing organic compound produced by the production method of the present invention can be used, for example, as a starting material in organic synthesis.

The invention claimed is:

1. A method of producing an organosilicon compound, comprising a reaction step of reacting an alkene with a hydrosilane in the presence of a platinum element-containing nanoparticle where a solvent selected from the group consisting of ethylene glycol, dimethylacetamide, N, N-dimethylformamide, N-methylpyrrolidone, and dimethylsulfoxide is coordinated to a platinum atom on a surface of the nanoparticle to produce an organosilicon compound,
    wherein said reaction step is performed in the presence of an iron element-containing nanoparticle where a solvent selected from the group consisting of ethylene glycol, dimethylacetamide, N, N-dimethylformamide, N-methylpyrrolidone, and dimethylsulfoxide is coordinated to an iron atom on the surface of the nanoparticle in addition to said a platinum element-containing nanoparticle, and
    wherein said alkene is a compound represented by the following formula (A-1) or a compound represented by the following formula (A-2) and said hydrosilane is a compound represented by the following formula (B):

(A-1)

wherein, in the formula (A-1), $R^1$ is a $C_1$-$C_{20}$ hydrocarbon group,

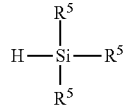
(A-2)

wherein, in the formula (A-2), R is a $C_1$-$C_{19}$ hydrocarbon group, and

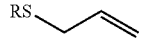
(B)

wherein, in the formula (B), $R^5$ is each independently a $C_1$-$C_{20}$ hydrocarbon group or a $C_1$-$C_{10}$ alkoxy group.

2. The method of producing an organosilicon compound according to claim 1, wherein the use ratio of said iron element-containing nanoparticle to said platinum element-containing nanoparticle is 0.01 to 20, where the use ratio corresponds to the amount of substance of said iron element/the amount of substance of said platinum element.

* * * * *